United States Patent
Okabe

(10) Patent No.: US 8,642,226 B2
(45) Date of Patent: Feb. 4, 2014

(54) SEPARATOR FOR FUEL CELL AND FUEL CELL

(75) Inventor: Hiroki Okabe, Okazaki (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 83 days.

(21) Appl. No.: 13/361,671

(22) Filed: Jan. 30, 2012

(65) Prior Publication Data

US 2012/0301806 A1 Nov. 29, 2012

Related U.S. Application Data

(63) Continuation of application No. PCT/JP2011/002938, filed on May 26, 2011.

(51) Int. Cl.
*H01M 2/38* (2006.01)
*H01M 2/40* (2006.01)
*H01M 8/24* (2006.01)
*H01M 4/64* (2006.01)

(52) U.S. Cl.
USPC .......................... 429/457; 429/458; 429/518

(58) Field of Classification Search
USPC ......................................... 429/457, 458, 518
See application file for complete search history.

(56) References Cited

U.S. PATENT DOCUMENTS 6,410,178 B1 * 6/2002 Matsukawa ................. 429/514

FOREIGN PATENT DOCUMENTS

| JP | 2000-113897 A | 4/2000 |
|---|---|---|
| JP | 2000-164230 A | 6/2000 |
| JP | 2003-242994 A | 8/2003 |
| JP | 2004-319279 A | 11/2004 |
| JP | 2005-122976 A | 5/2005 |
| JP | 2007-165257 A | 6/2007 |
| JP | 2009-170286 A | 7/2009 |
| JP | 2010-507212 A | 3/2010 |
| JP | 2010-073626 A | 4/2010 |
| JP | 2010-086695 A | 4/2010 |
| WO | 2012/035585 A1 | 3/2012 |

OTHER PUBLICATIONS

International Search Report issued Aug. 16, 2011 in PCT/JP2011/002938.

* cited by examiner

*Primary Examiner* — Patrick Ryan
*Assistant Examiner* — Julian Anthony
(74) *Attorney, Agent, or Firm* — Kenyon & Kenyon LLP

(57) ABSTRACT

A separator includes a first flow path-forming portion and second flow path-forming portions. The first portion has a corrugated shape including a first groove to form a flow path for a first fluid on a first surface and a second groove to form a flow path for a second fluid on a second surface, which are arranged alternately. The first portion includes at least three linear areas, and plural turned areas, each including a plurality of the first and the second grooves to connect between corresponding grooves in adjacent linear areas, and thereby forms serpentine flow paths for the second fluid. Each of the second portions forms a connection flow path to connect between the flow paths for the first fluid on the first surface and forms a connection flow path to connect between the flow paths for the second fluid on the second surface.

6 Claims, 15 Drawing Sheets

Fig.12

| | STRUCTURE | | POWER GENERATION PERFORMANCES | | | |
|---|---|---|---|---|---|---|
| | INLET/ OUTLET PORTION | TURNED PORTION | DRAINAGE PERFORMANCE | GAS DISTRIBUTION | FCC DISTRIBUTION | LOAD |
| EMBODIMENT | DIMPLE | ORTHOGONAL FLOW PATH | ○ | ○ | ○ | ○ |
| COMPARATIVE EXAMPLE 1 | ORTHOGONAL FLOW PATH | DIMPLE | ○ | ○ | × | × |
| COMPARATIVE EXAMPLE 2 | DIMPLE | DIMPLE | × | ○ | ○ | × |

SEPARATOR FOR FUEL CELL AND FUEL CELL

This is a PCT By-Pass Continuation application of PCT/JP2011/002938 filed 26 May 2011, the contents of which are incorporated herein by reference.

BACKGROUND

1. Technical Field

The present invention relates to a separator for fuel cell and a fuel cell including the separator.

2. Background Art

In general, a fuel cell, for example, a polymer electrolyte fuel cell, is used in stack structure provided by stacking a plurality of power generation layers, each including an electrolyte membrane and a pair of electrodes (anode and cathode), via separators for separating a fuel gas and an oxidizing gas as reactive gases. Flow paths for fluids such as the reactive gases and a cooling medium (for example, cooling liquid), are formed inside the fuel cell.

One proposed separator for fuel cell has a corrugated cross-sectional shape including a plurality of first grooves concave to one surface and a plurality of second grooves concave to the other surface, which are arranged alternately. In this separator, the first grooves form flow paths for a first fluid (for example, cooling liquid) on one surface, whilst the second grooves form flow paths for a second fluid (for example, fuel gas) on the other surface. The fuel cell has manifolds for supplying and discharging the first fluid and the second fluid, which are formed to pass through the fuel cell in its stacking direction. The respective flow paths for the first fluid are connected with a first fluid supply manifold and with a first fluid discharge manifold. The respective flow paths for the second fluid are connected with a second fluid supply manifold and with a second fluid discharge manifold.

A known technique adopted for efficiently distributing a fluid over the whole area of the power generation layer forms flow paths for the fluid inside the fuel cell to have serpentine shape (hereinafter also called "serpentine flow paths") (see, for example, JP 2003-242994A and JP 2009-170286A).

SUMMARY

In the prior art separator for fuel cell having the corrugated cross-sectional shape, the flow direction of the flow paths for the first fluid formed by adjacent first grooves and the flow direction of the flow paths for the second fluid formed by adjacent second grooves are restricted to be parallel to each other. When the flow paths for the second fluid formed by the second grooves are provided as serpentine flow paths, the flow direction of the flow paths for the first fluid formed by the first grooves on the other surface is also limited by the serpentine structure. It is accordingly difficult to ensure the good dispersion of both the fluids through the respective fluid flow paths provided on the respective surfaces of the separator, especially at the inlet positions and outlet positions of the respective fluid flow paths. Providing additional parts for a separator increases the degree of freedom in setting the respective flow directions of the flow paths for the two different fluids. This, however, increases the total number of component parts, which results in undesirable weight increase, size increase and cost increase.

This problem is not characteristic of the separator for polymer electrolyte fuel cells but is commonly found in separators for various fuel cells.

Consequently, in order to address the problem described above, there is a need to ensure good dispersion of respective fluids through corresponding fluid flow paths provided on respective surfaces of a separator for fuel cell, even when the flow paths for one of the fluids provided on one surface of the separator are formed to have serpentine shape (serpentine flow paths).

In order to achieve at least part of the foregoing, the present invention provides various aspects and embodiments described below.

First aspect: According to a first aspect of the invention, there is provided a separator for fuel cell, comprising: a first flow path-forming portion having a corrugated cross-sectional shape including a first groove concave to a first surface to form a flow path for a first fluid on the first surface and a second groove concave to a second surface to form a flow path for a second fluid on the second surface, which are arranged alternately, the first flow path-forming portion comprising at least three linear areas parallel to one another, each including a plurality of the first grooves and a plurality of the second grooves, and plural turned areas, each including a plurality of the first grooves and a plurality of the second grooves to connect between corresponding grooves in adjacent linear areas, and thereby forming serpentine flow paths for the second fluid; and second flow path-forming portions provided adjacent to an inlet position and an outlet position of the flow paths for the second fluid in the first flow path-forming portion, each of the second flow path-forming portions forming a connection flow path to connect between flow paths for the first fluid on the first surface and forming a connection flow path to connect between the flow paths for the second fluid on the second surface, wherein each of the second grooves in each of the turned areas has a shallower groove portion having less depth from the second surface than depth of a remaining portion, so that a connection flow path is formed on the first surface to connect two adjacent flow paths for the first fluid across the shallower groove portion.

In the separator for fuel cell according to the first aspect, the flow paths for the second fluid in the first flow path-forming portion having the corrugated cross-sectional shape are formed to have serpentine shape (serpentine flow paths). The flow paths for the first fluid are interconnected and the flow paths for the second fluid are also interconnected in the second flow path-forming portions located adjacent to the inlet position and the outlet position of the serpentine flow paths for the second fluid. The connection flow path is formed on the first surface by the shallower groove portion in each of the turned areas to connect between the flow paths for the first fluid. This structure ensures the good dispersion of the respective fluids through the corresponding fluid flow paths provided on the respective surfaces of the separator. This structure of the separator for fuel cell also minimizes the increase in total number of component parts.

Second aspect: In the separator for fuel cell according to the first aspect, the first fluid is a cooling liquid; and the second fluid is either a fuel gas or an oxidizing gas.

In the separator for fuel cell according to the second aspect, the flow paths for the second fluid, which is either the fuel gas or the oxidizing gas, are formed to have serpentine shape, so as to efficiently distribute the second fluid over the whole area of the power generation layer. This structure ensure good dispersion of the respective fluids through the corresponding fluid flow paths provided on the respective surfaces of the separator, while improving the drainage performance in the flow paths for the second fluid, thus effectively reducing degradation of power generation performance of the fuel cell.

Third aspect: In the separator for fuel cell according to either one of the first aspect and the second aspect, a second opening for forming a manifold for the second fluid is provided to be at least partly opposed to the second flow path-forming portion, and a first opening for forming a manifold for the first fluid is provided to have one part opposed to the second flow path-forming portion and another part opposed to the turned area of the first flow path-forming portion.

In the separator for fuel cell according to the third aspect, the second flow path-forming portion is opposed to both the second opening for forming the manifold for the second fluid and the first opening for forming the manifold for the first fluid. This structure ensures balanced distribution and balanced discharge of both the first fluid and the second fluid across the second flow path-forming portion.

Fourth aspect: In the separator for fuel cell according to any one of the first aspect through the third aspect, each of the second flow path-forming portions includes a flat plate member, a plurality of separate first projections protruded on the first surface from the flat plate member, and a plurality of separate second projections protruded on the second surface from the flat plate member.

The separator for fuel cell according to the fourth aspect effectively reduces degradation of power generation performance of the fuel cell caused by the decreased distribution of the first fluid, while causing the second flow path-forming portion to form connection flow paths for connecting between the flow paths for the first fluid on the first surface and to form connection flow paths for connecting between the flow paths for the second fluid on the second surface.

Fifth aspect: In the separator for fuel cell according to any one of the first aspect through the fourth aspect, position of a bottom of the shallower groove portion in a stacking direction is closer to the second surface than position of the remaining portion of the second groove.

In the separator for fuel cell according to the fifth aspect, the connection flow path to connect between two adjacent flow paths for the first fluid across the shallower groove portion is formed on the first surface without varying the thickness of the material between the shallower groove portion and the remaining portion.

The present invention may be implemented by diversity of aspects, for example, a separator for fuel cell, a fuel cell including the separator for fuel cell, a fuel cell system including the fuel cell, and a moving body, such as an automobile, including the fuel cell system.

BRIEF DESCRIPTION OF THE DRAWINGS

FIG. 12 shows the results of performance evaluation;

DESCRIPTION OF THE EMBODIMENT

The embodiments of the present invention are described below.

A. Embodiment

Figure 1:
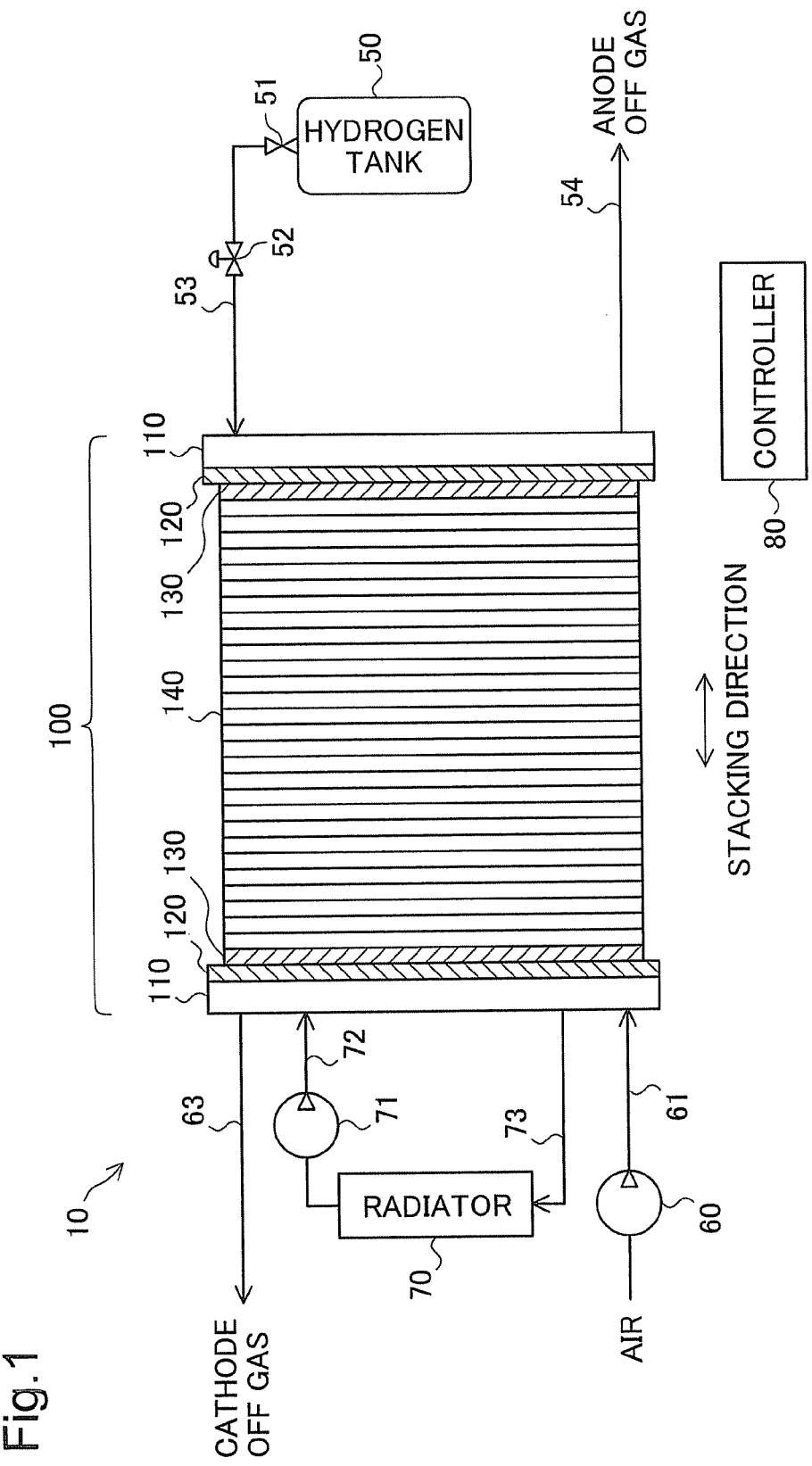
FIG. 1 schematically illustrates the configuration of a fuel cell system 10 according to one embodiment of the invention.

FIG. 1 schematically illustrates the configuration of a fuel cell system 10 according to one embodiment of the invention. The fuel cell system 10 includes a fuel cell 100. The fuel cell 100 has stack structure by stacking an end plate 110, an insulating plate 120, a collector plate 130, a plurality of unit cells 140, another collector plate 130, another insulating plate 120 and another end plate 110 in this sequence.

Hydrogen as a fuel gas is supplied from a hydrogen tank 50 for storing high-pressure hydrogen to the fuel cell 100 via a stop valve 51, a regulator 52 and a piping 53. The supplied hydrogen is distributed to the respective unit cells 140 via a fuel gas supply manifold (described later) to be used for power generation in the respective unit cells 140. The remaining hydrogen not consumed in the respective unit cells 140 (i.e., anode off gas) is collected via a fuel gas discharge manifold (described later) and is discharged out of the fuel cell 100 via a discharge piping 54. The fuel cell system 10 may have a recirculation mechanism to recirculate the anode off gas to the piping 53 for supply.

The air as an oxidizing gas is also supplied to the fuel cell 100 via an air pump 60 and a piping 61. The supplied air is distributed to the respective unit cells 140 via an oxidizing gas supply manifold (described later) to be used for power generation in the respective unit cells 140. The remaining air not consumed in the respective unit cells 140 (i.e., cathode off gas) is collected via an oxidizing gas discharge manifold (described later) and is discharged out of the fuel cell 100 via a piping 63. The fuel gas and the oxidizing gas are also called reactive gas.

Additionally, a cooling medium cooled down by a radiator 70 is also supplied to the fuel cell 100 via a water pump 71 and a piping 72, in order to cool down the respective unit cells 140 of the fuel cell 100. The supplied cooling medium is introduced to the respective unit cells 140 via a cooling medium supply manifold (described later) to cool down the respective unit cells 140. The cooling medium used for cooling down the respective unit cells 140 is collected via a cooling medium discharge manifold (described later) and is circulated to the radiator 70 via a piping 73. The cooling medium may be, for example, water, antifreeze such as ethylene glycol or the air. This embodiment uses a cooling liquid as the liquid cooling medium (hereinafter also called "FCC").

The fuel cell system 10 further includes a controller 80. The controller 80 is implemented by a computer including a CPU and memories (not shown). The controller 80 receives signals from various sensors, e.g., temperature sensor, pressure sensor and voltmeter, disposed at various locations in the fuel cell system 10 and controls the operations of the whole fuel cell system 10 based on the received signals.

Figure 2:
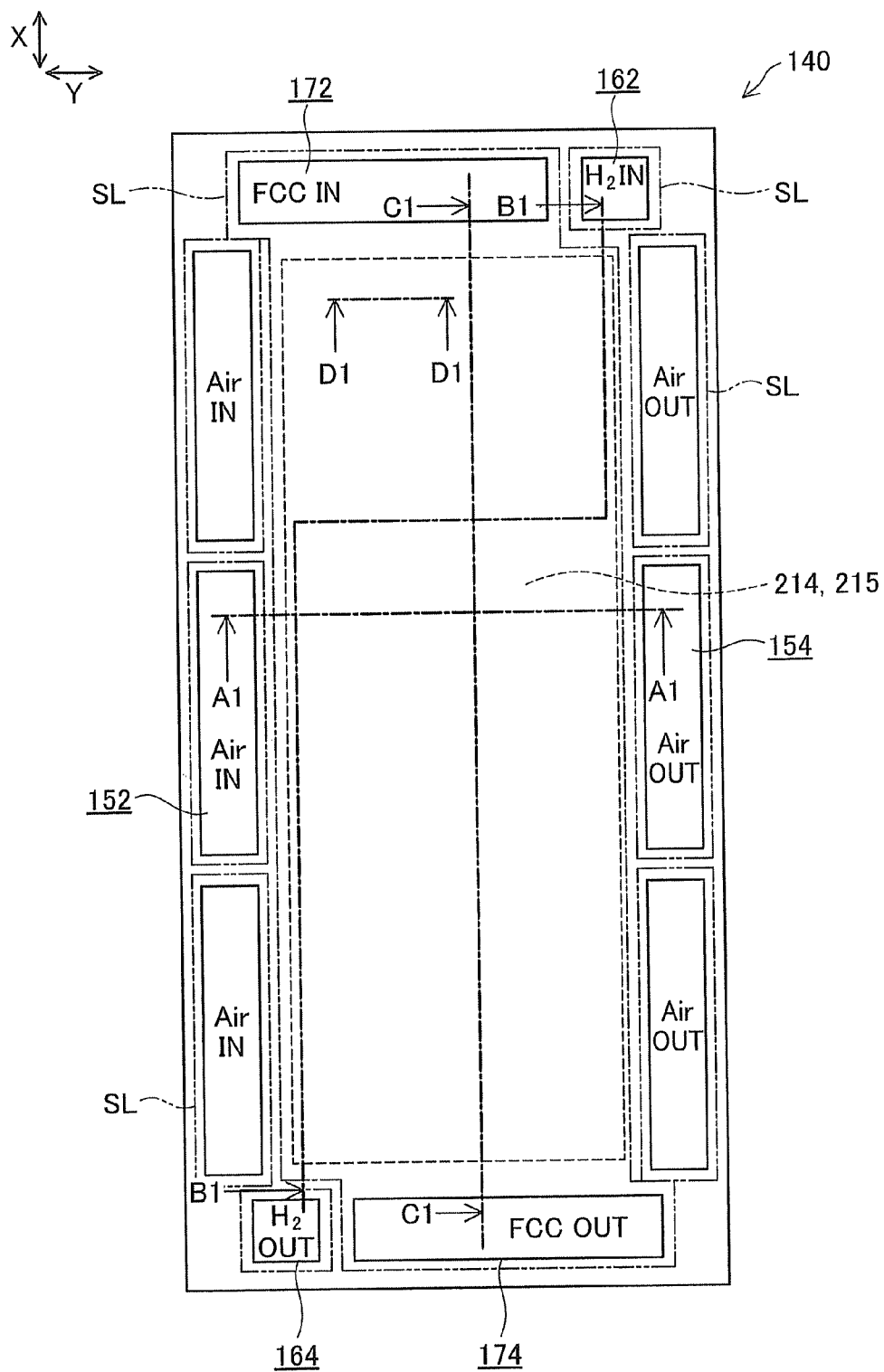
FIG. 2 illustrates the planar structure of a unit cell 140 included in a fuel cell 100.
Figure 3:
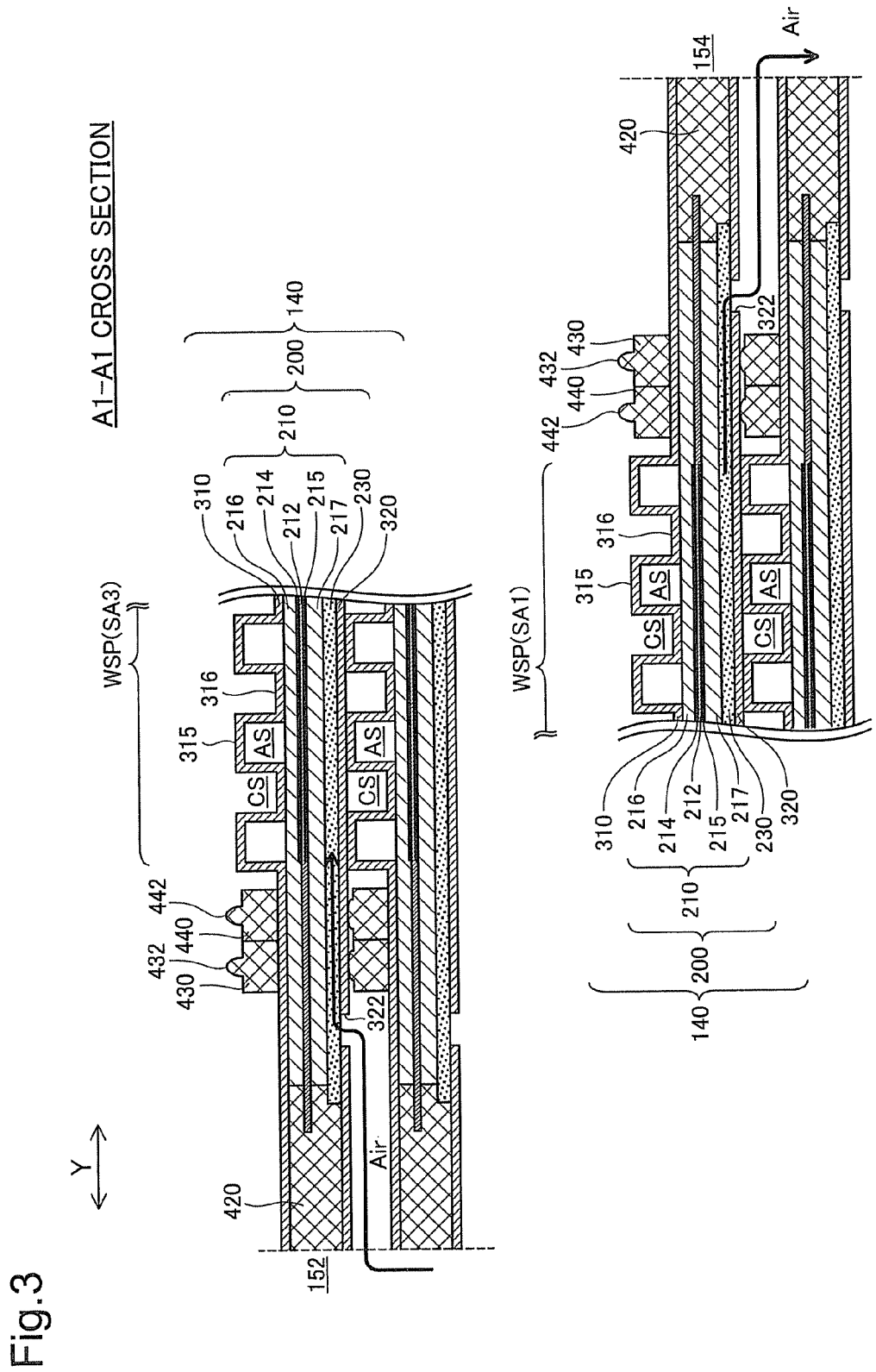
FIG. 3 illustrates the sectional structure of the fuel cell 100.
Figure 4:
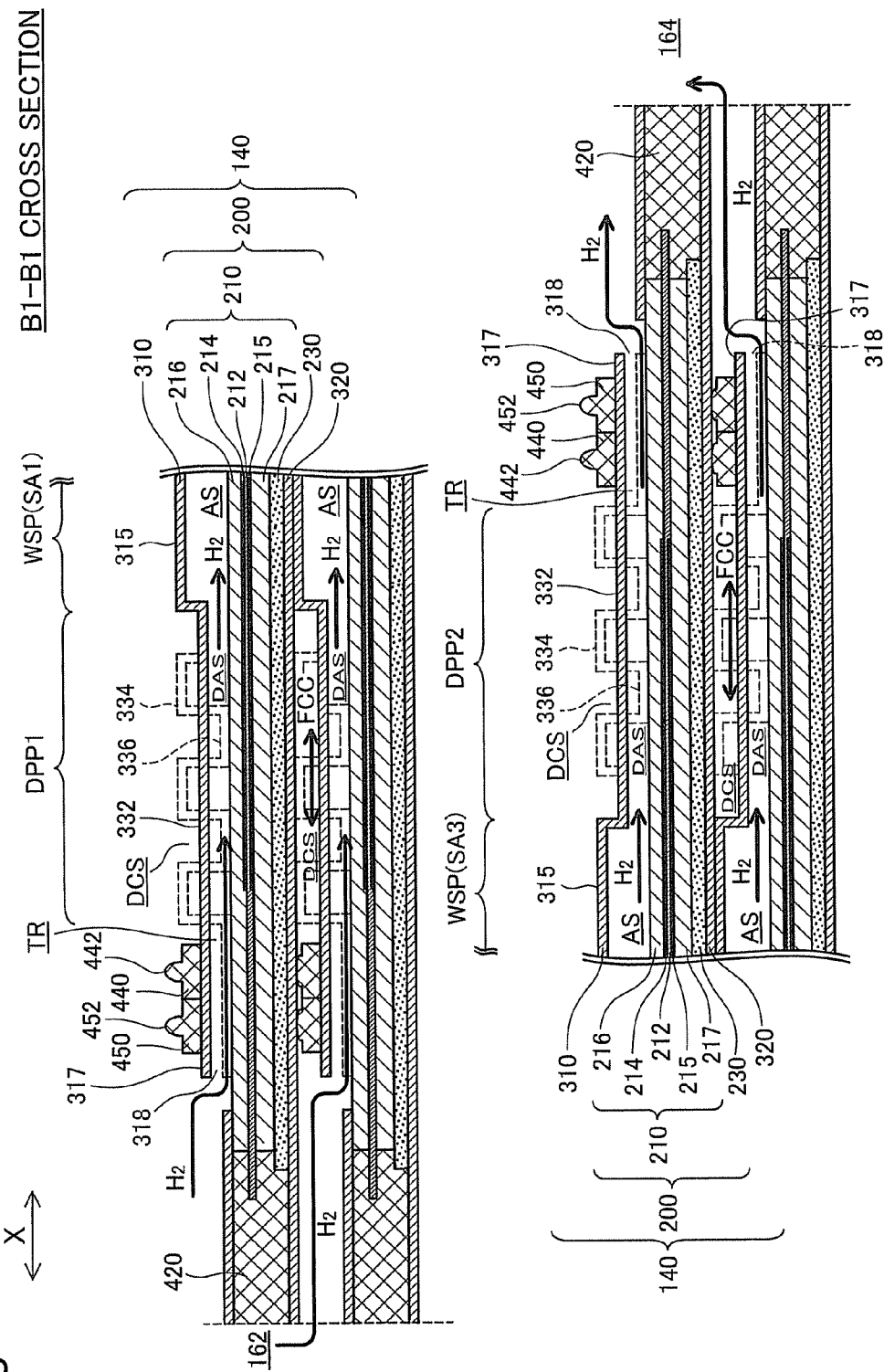
FIG. 4 illustrates the sectional structure of the fuel cell 100.
Figure 5:
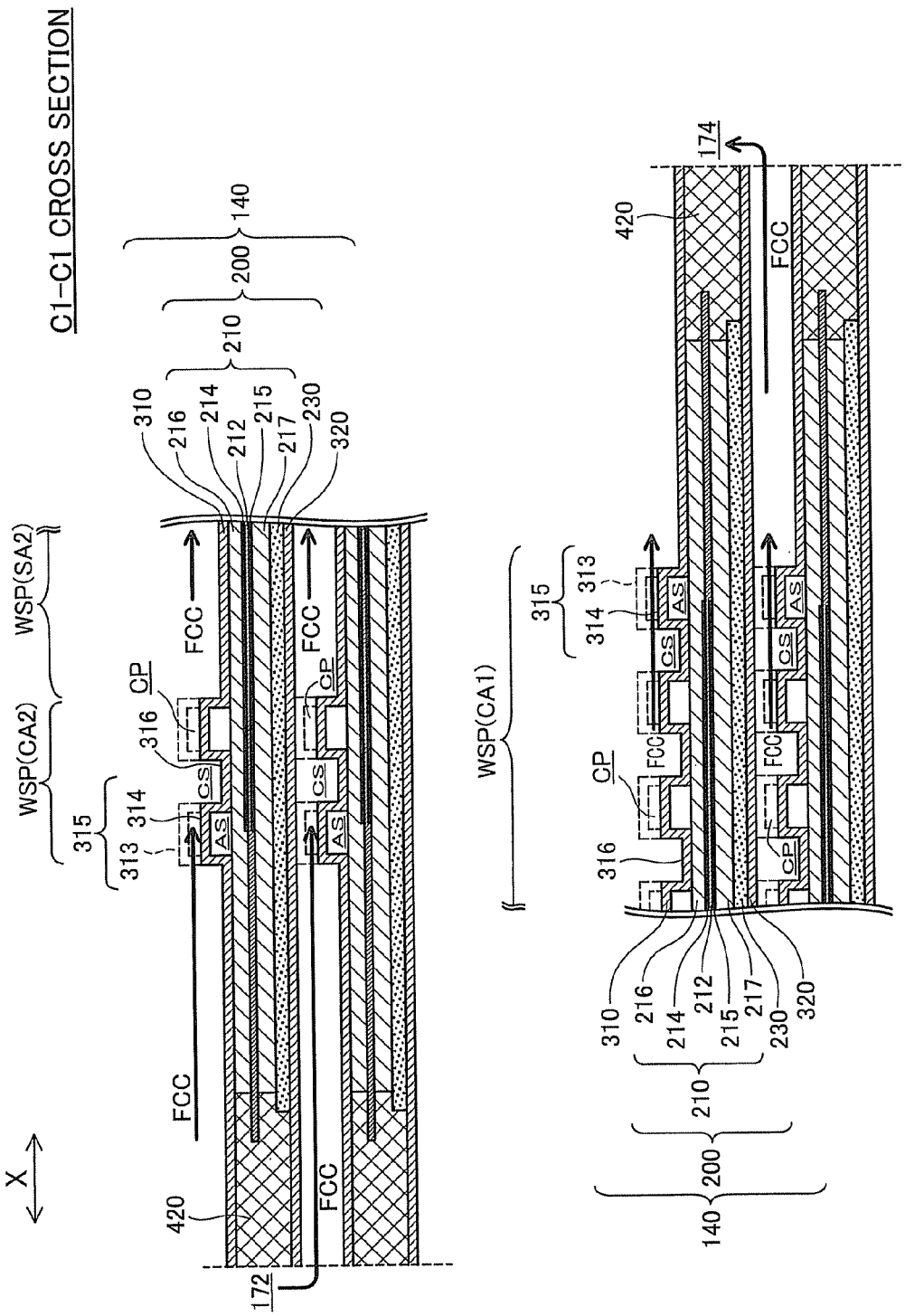
FIG. 5 illustrates the sectional structure of the fuel cell 100.
Figure 6:
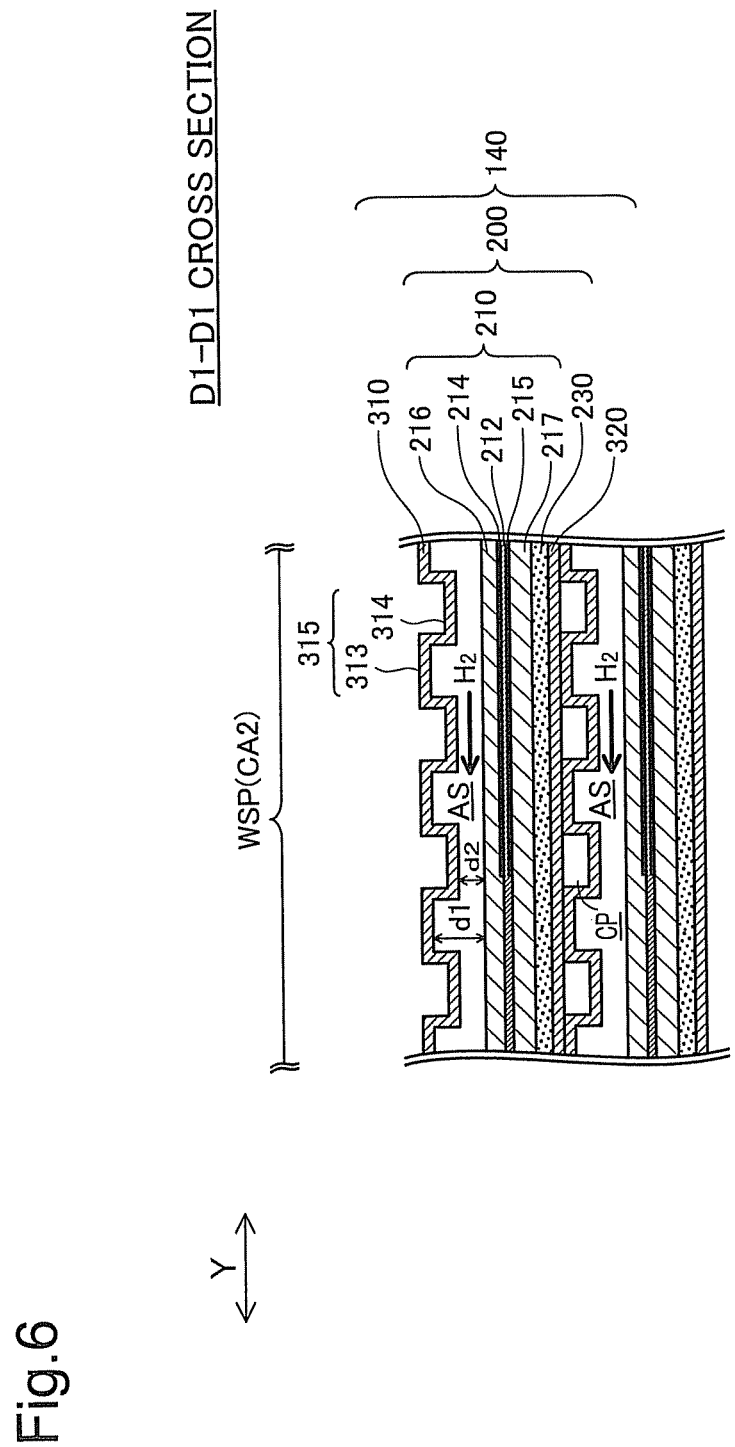
FIG. 6 illustrates the sectional structure of the fuel cell 100.
Figure 7:
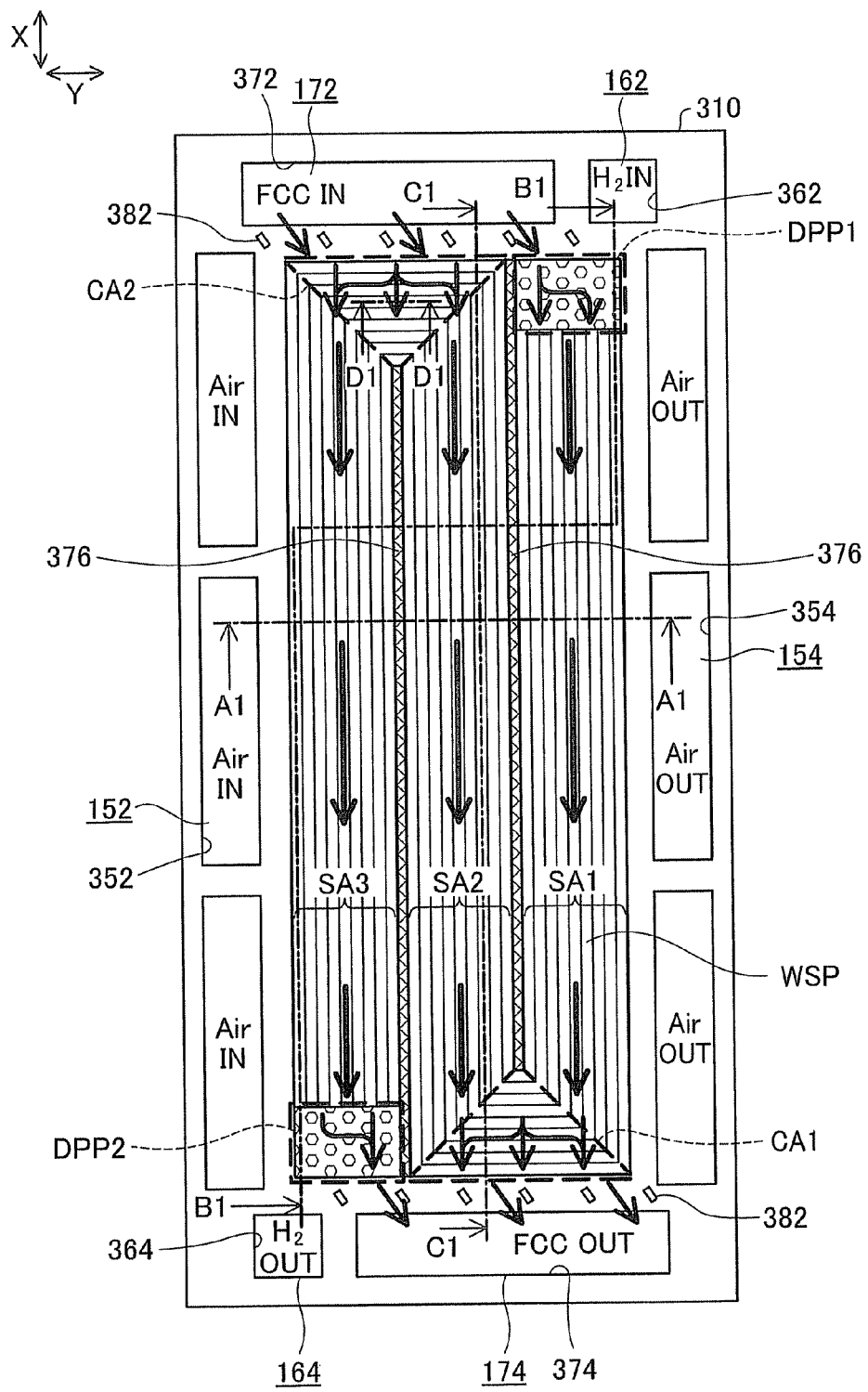
FIG. 7 illustrates the planar structure of an anode-side separator 310.
Figure 8:
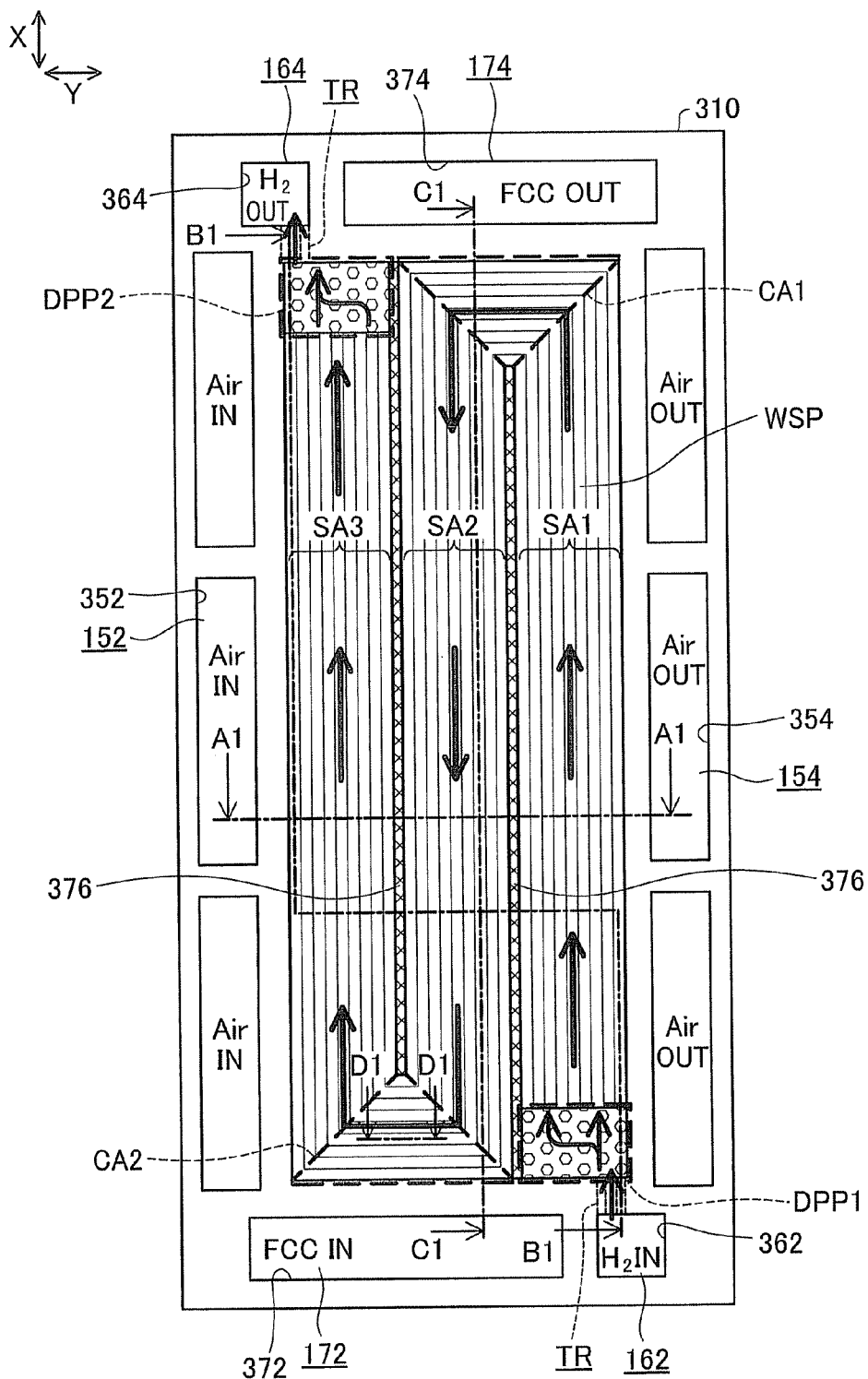
FIG. 8 illustrates the planar structure of the anode-side separator 310.

FIG. 2 illustrates the planar structure of the unit cell 140 included in the fuel cell 100. FIGS. 3 through 6 illustrate the sectional structures of the fuel cell 100. FIGS. 7 and 8 illustrate the planar structures of an anode-side separator 310 included in the unit cell 140. FIG. 3 shows the partial cross section of the fuel cell 100 at an A1-A1 position of FIGS. 2, 7 and 8. FIG. 4 shows the partial cross section of the fuel cell 100 at a B1-B1 position of FIGS. 2, 7 and 8. FIG. 5 shows the partial cross section of the fuel cell 100 at a C1-C1 position of FIGS. 2, 7 and 8. FIG. 6 shows the partial cross section of the fuel cell 100 at a D1-D1 position of FIGS. 2, 7 and 8. FIG. 7 shows the planar structure on one surface of the anode-side separator 310 (i.e., surface opposed to a cathode-side separator 320 of another adjacent unit cell 140; hereinafter called "first surface"). FIG. 8 shows the planar structure on the other surface of the anode-side separator 310 (i.e., surface opposed to a power generation layer 200; hereinafter called "second surface").

Referring to FIG. 2, the fuel cell 100 includes a fuel gas supply manifold 162 to distribute the hydrogen supplied to the fuel cell 100 as the fuel gas to the respective unit cells 140, an oxidizing gas supply manifold 152 to distribute the air supplied to the fuel cell 100 as the oxidizing gas to the respective unit cells 140, a fuel gas discharge manifold 164 to collect the fuel gas not consumed in the respective unit cells 140 and discharge the collected fuel gas out of the fuel cell 100, an oxidizing gas discharge manifold 154 to collect the oxidizing gas not consumed in the respective unit cells 140 and discharge the collected oxidizing gas out of the fuel cell 100, a cooling liquid supply manifold 172 to distribute the cooling liquid supplied to the fuel cell 100 to the respective unit cells 140, and a cooling liquid discharge manifold 174 to collect the cooling liquid from the respective unit cells 140 and discharge the collected cooling liquid out of the fuel cell 100. The respective manifolds are flow paths extended in the direction substantially parallel to the stacking direction of the fuel cell 100 (i.e., the direction substantially perpendicular to the planar direction of the unit cell 140).

As shown in FIG. 2, the unit cell 140 has an approximately rectangular planar shape and has the respective manifolds located near the outer circumferential sides on the plane of the unit cell 140. More specifically, the fuel gas supply manifold 162 and the cooling liquid supply manifold 172 are located adjacent to one shorter side among the outer circumferential sides of the unit cell 140. The fuel gas discharge manifold 164 and the cooling liquid discharge manifold 174 are located adjacent to the other shorter side among the outer circumferential sides of the unit cell 140. The positional relationship between the fuel gas supply manifold 162 and the cooling liquid supply manifold 172 along the shorter side direction of the outer circumference of the unit cell 140 is reverse to the positional relationship between the fuel gas discharge manifold 164 and the cooling liquid discharge manifold 174. The oxidizing gas supply manifold 152 is located adjacent to one longer side among the outer circumferential sides of the unit cell 140 (i.e., the longer side away from the fuel gas supply manifold 162). The oxidizing gas discharge manifold 154 is located adjacent to the other longer side among the outer circumferential sides of the unit cell 140 (i.e., the longer side close to the fuel gas supply manifold 162).

In the description hereof, the direction of stacking the unit cells 140 in the fuel cell 100 is called "stacking direction", and the direction parallel to the main surfaces of the unit cell 140 (i.e., the direction substantially perpendicular to the stacking direction) is called "planar direction". In the planar direction, the direction parallel to the longer sides of the unit cell 140 is called X direction, and the direction parallel to the shorter sides of the unit cell 140 (i.e., the direction substantially perpendicular to the X direction) is called Y direction.

As shown in FIGS. 3 through 6, the unit cell 140 of the fuel cell 100 has a power generation layer 200 located between a pair of separators (cathode-side separator 320 and anode-side separator 310). The power generation layer 200 includes a membrane electrode assembly or MEA 210, which includes an anode (anode electrode layer) 214 and a cathode (cathode electrode layer) 215 provided on the respective surfaces of an electrolyte membrane 212. The membrane electrode assembly 210 further includes an anode diffusion layer 216 provided outside the anode 214, and a cathode diffusion layer 217 provided outside the cathode 215. The power generation layer 200 further includes a cathode-side porous flow path layer 230 provided outside the cathode diffusion layer 217 of the membrane electrode assembly 210.

The electrolyte membrane 212 is a solid polymer membrane made of a fluorine resin material or a hydrocarbon resin material and has good proton conductivity in the wet state. The cathode 215 and the anode 214 contain, for example, platinum or an alloy of platinum and another metal, as the catalyst. The area bounded by the broken line in FIG. 2 represents the area where the cathode and the anode 214 are located on the plane of the unit cell 140.

The cathode diffusion layer 217 and the anode diffusion layer 216 are made of, for example, carbon cloth of woven carbon fibers, carbon paper or carbon felt. The cathode-side porous flow path layer 230 is made of a porous material having gas diffusivity and electrical conductivity, such as metal porous body (for example, expanded metal) or carbon porous body. The cathode-side porous flow path layer 230 has the higher porosity and the lower internal gas flow resistance than the cathode diffusion layer 217 and hence serves as the oxidizing gas flow path, through which the oxidizing gas flows.

The cathode-side separator 320 is produced by making holes in the metal plate to form the openings for the respective manifolds. As shown in FIGS. 3 through 6, the cathode-side separator 320 has flat plate-like shape.

The anode-side separator 310 is produced by making holes in the metal plate to form the openings for the respective manifolds and press-working the metal plate to form the concavo-convex shape.

As shown in FIGS. 7 and 8, the anode-side separator 310 includes an opening 362 for the fuel gas supply manifold 162, an opening 364 for the fuel gas discharge manifold 164, an opening 352 for the oxidizing gas supply manifold 152, an opening 354 for the oxidizing gas discharge manifold 154, an opening 372 for the cooling liquid supply manifold 172, and an opening 374 for the cooling liquid discharge manifold 174. The opening 372 and the opening 374 correspond to the first opening of the invention. The opening 362 and the opening 364 correspond to the second opening of the invention.

The anode-side separator 310 includes a corrugated portion WSP and dimpled portions DPP (dimpled portions DPP1 and DPP2) to form the flow paths for the cooling liquid on the first surface (FIG. 7) and the flow paths for the fuel gas on the second surface (FIG. 8). The corrugated portion WSP corresponds to the first flow path-forming element of the invention. The dimpled portion DPP corresponds to the second flow path-forming element of the invention.

As shown in FIGS. 7 and 8, the corrugated portion WSP includes three linear areas SA1, SA2 and SA3 and two turned areas CA1 and CA2. The three linear areas SA1, SA1 and SA3 are extended along the X direction and are sequentially arranged along the Y direction. In other words, the three linear areas SA1, SA2 and SA3 are substantially parallel to one another.

The first turned area CA1 is provided between one end (upper end in FIG. 8) of the second linear area SA2 located in the middle and a corresponding end on the same side of the first linear area SA1. More specifically, the boundaries of the corresponding ends on this side (upper ends in FIG. 8) of the linear areas SA2 and SA1 are not parallel to the Y direction but have a certain angle. The turned area CA1 of approximately triangular shape is provided between the boundaries of the ends of the linear areas SA2 and SA1. Similarly, the second turned area CA2 is provided between the other end (lower end in FIG. 8) of the second linear area SA2 and a corresponding end on the same side of the third linear area SA3. More specifically, the boundaries of the corresponding ends on this side (lower ends in FIG. 8) of the linear areas SA2 and SA3 are not parallel to the Y direction but have a certain angle. The turned area CA2 of approximately triangular shape is provided between the boundaries of the ends of the linear areas SA2 and SA3.

The other end (lower end in FIG. 8) of the first linear area SA1, which is opposite to the end adjoining the turned area CA1, is adjacent to the first dimpled portion DPP1. More specifically, the boundary of the end on this side (lower end in FIG. 8) of the linear area SA1 is substantially parallel to the Y direction, and the dimpled portion DPP1 of approximately rectangular shape is provided adjoining this boundary. Similarly, the other end (upper end in FIG. 8) of the third linear area SA3, which is opposite to the end adjoining the turned area CA2, is adjacent to the second dimpled portion DPP2. More specifically, the boundary of the end on this side (upper end in FIG. 8) of the linear area SA3 is substantially parallel to the Y direction, and the dimpled portion DPP2 of approximately rectangular shape is provided adjoining this boundary.

As described above, in the anode-side separator 310 of the embodiment, the dimpled portions DPP and the turned areas CA form the respective ends in the X direction of the flow path-forming elements including the corrugated portion WSP and the dimpled portions DPP.

A partition member 376 is provided between the first linear area SA1 along with the first dimpled portion DPP1 and the second linear area SA2 and is extended in the X direction to interfere with transfer of the fluid between the first linear area SA1 along with the first dimpled portion DPP1 and the second linear area SA2. Similarly, another partition member 376 is provided between the third linear area SA3 along with the second dimpled portion DPP2 and the second linear area SA2 and is extended in the X direction to interfere with transfer of the fluid between the third linear area SA3 along with the second dimpled portion DPP2 and the second linear area SA2.

One end (upper end in FIG. 8) of the first linear area SA1 is opposed to the cooling liquid discharge manifold 174 across the first turned area CA1. The other end (lower end in FIG. 8) of the first linear area SA1 is opposed to the fuel gas supply manifold 162 and the cooling liquid supply manifold 172 across the first dimpled portion DPP1. One end (upper end in FIG. 8) of the second linear area SA2 is opposed to the cooling liquid discharge manifold 174 across the first turned area CAL The other end (lower end in FIG. 8) of the second linear area SA2 is opposed to the cooling liquid supply manifold 172 across the second turned portion CA2. One end (upper end in FIG. 8) of the third linear area SA3 is opposed to the fuel gas discharge manifold 164 and the cooling liquid discharge manifold 174 across the second dimpled portion DPP2. The other end (lower end in FIG. 8) of the third linear area SA3 is opposed to the cooling liquid supply manifold 172 across the second turned portion CA2.

Figure 9:
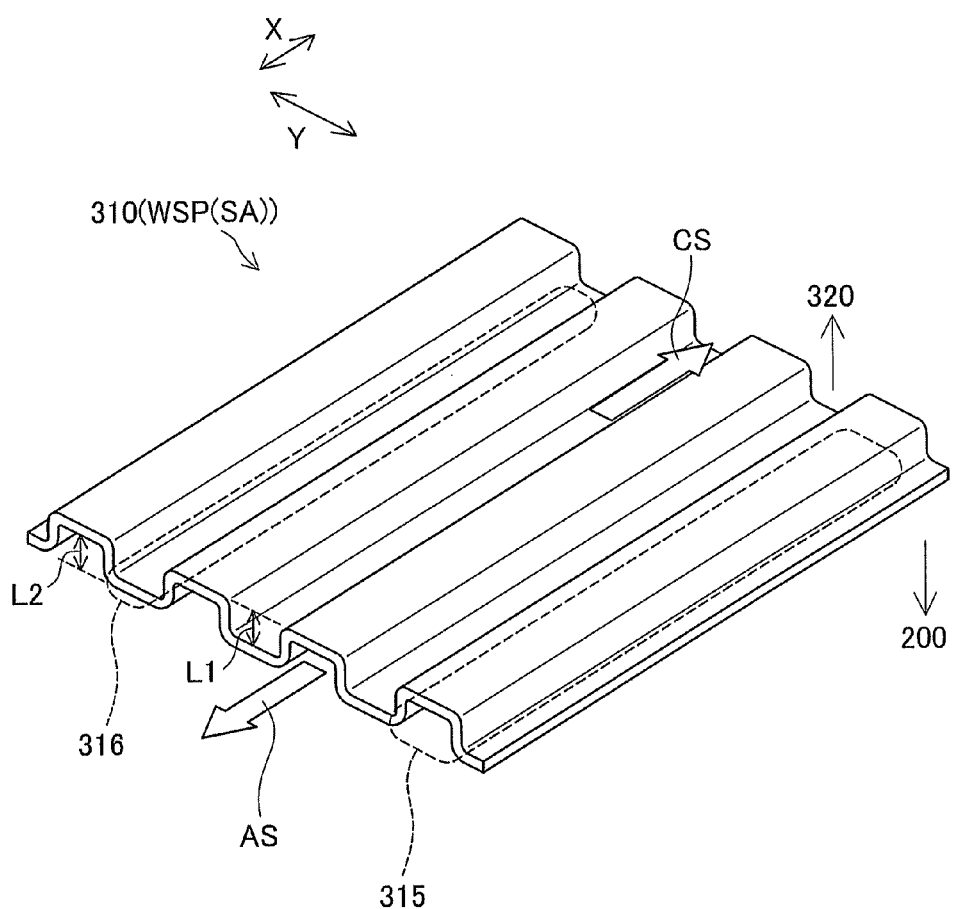
FIG. 9 is a perspective view showing the structure of a linear area SA included in a corrugated portion WSP of the anode-side separator 310.

FIG. 9 is a perspective view showing the structure of the linear area SA of the corrugated portion WSP in the anode-side separator 310. FIG. 9 illustrates the partial structure of one linear area SA in close-up. The upper surface of FIG. 9 corresponds to the first surface (i.e., surface opposed to the cathode-side separator 320 of another adjacent unit cell 140), and the lower surface of FIG. 9 corresponds to the second surface (i.e., surface opposed to the power generation layer 200). As shown in FIGS. 9 and 3, the linear area SA of the corrugated portion WSP has corrugated cross-sectional shape including a plurality of first grooves 316 concave to the first surface and a plurality of second grooves 315 concave to the second surface, which are arranged alternately along the Y direction. This cross-sectional shape is formed by press-working and folding the metal plate. Each of the first grooves 316 and each of the second grooves 315 have planes extended linearly in the X direction. Each of the linear areas SA includes a preset number of the first grooves 316 and a preset number of the second grooves 315.

As shown in FIGS. 9 and 3, the first grooves 316 form flow paths CS for the cooling liquid on the first surface (i.e., surface opposed to the cathode-side separator 320 of another adjacent unit cell 140). The cooling liquid flow paths CS are the space defined by the first grooves 316 and the cathode-side separator 320 of another adjacent unit cell 140. Since the first grooves 316 are extended in the X direction in the linear area SA of the corrugated portion WSP, the cooling liquid flow paths CS are formed as the flow path space extended in the X direction. The cooling liquid corresponds to the first fluid of the invention.

The second grooves 315 form flow paths AS for the fuel gas on the second surface (i.e., surface opposed to the power generation layer 200). The fuel gas flow paths AS are the space defined by the second grooves 315 and the surface of the power generation layer 200. Since the second grooves 315 are extended in the X direction in the linear area SA of the corrugated portion WSP, the fuel gas flow paths AS are formed as the flow path space extended in the X direction. The fuel gas corresponds to the second fluid of the invention.

In the linear area SA of the corrugated portion WSP, the respective first grooves 316 have a fixed depth L1 (FIG. 9) from the first surface. The depth L1 of the first groove 316 refers to a distance in the stacking direction from the outermost position of the linear area SA on the first surface (i.e., position in contact with the cathode-side separator 320 of another adjacent unit cell 140) to the outermost position of the first groove 316 on the second surface (i.e., bottom of the first groove 316 substantially perpendicular to the stacking direction). The cooling liquid flow paths CS formed by the first grooves 316 on the first surface accordingly have a fixed depth. In the fuel cell 100 provided by stacking a plurality of unit cells 140, substantially the whole surface of the bottom of each of the first grooves 316 in the anode-side separator 310 is in contact with the surface of the power generation layer 200.

Similarly, in the linear area SA of the corrugated portion WSP, the respective second grooves 315 have a fixed depth L2 from the second surface. The depth L2 of the second groove 315 refers to a distance in the stacking direction from the outermost position of the linear area SA on the second surface (i.e., position in contact with the power generation layer 200) to the outermost position of the second groove 315 on the first surface (i.e., bottom of the second groove 315 substantially perpendicular to the stacking direction). The fuel gas flow paths AS formed by the second grooves 315 on the second surface accordingly have a fixed depth. In the fuel cell 100 provided by stacking a plurality of unit cells 140, substantially the whole surface of the bottom of each of the second grooves 315 in the anode-side separator 310 is in contact with the surface of the cathode-side separator 320 of another adjacent unit cell 140.

Figure 10:
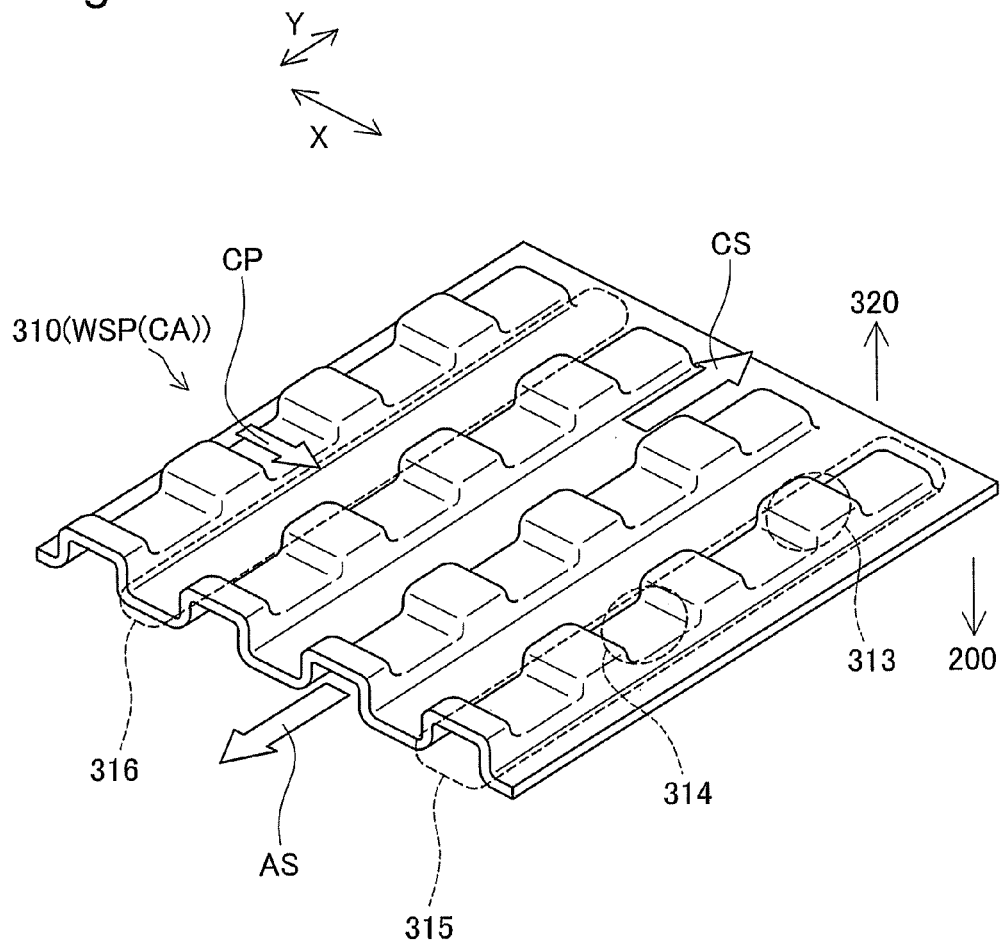
FIG. 10 is a perspective view showing the structure of a turned area CA included in the corrugated portion WSP of the anode-side separator 310.

FIG. 10 is a perspective view showing the structure of the turned area CA of the corrugated portion WSP of the anode-side separator 310. FIG. 10 illustrates the partial structure of one turned area CA in close-up. The upper surface of FIG. 10 corresponds to the first surface (i.e., surface opposed to the cathode-side separator 320 of another adjacent unit cell 140), and the lower surface of FIG. 10 corresponds to the second surface (i.e., surface opposed to the power generation layer 200). As shown in FIGS. 10, 5 and 6, the turned area CA of the corrugated portion WSP has corrugated cross-sectional shape including a plurality of the first grooves 316 concave to the first surface and a plurality of the second grooves 315 concave to the second surface, which are arranged alternately along the X direction. This cross-sectional shape is formed by press-working and folding the metal plate. Each of the first grooves 316 and each of the second grooves 315 have planes extended linearly in the Y direction. Each of the turned areas CA includes the same number of the first grooves 316 and the same number of the second grooves 315 as those in each of the linear areas SA.

As shown in FIGS. 10, 5 and 6, the first grooves 316 form flow paths CS for the cooling liquid on the first surface (i.e., surface opposed to the cathode-side separator 320 of another adjacent unit cell 140). The cooling liquid flow paths CS are the space defined by the first grooves 316 and the cathode-side separator 320 of another adjacent unit cell 140. Since the first grooves 316 are extended in the Y direction in the turned area CA of the corrugated portion WSP, the cooling liquid flow paths CS are formed as the flow path space extended in the Y direction.

The second grooves 315 form flow paths AS for the fuel gas on the second surface (i.e., surface opposed to the power generation layer 200). The fuel gas flow paths AS are the space defined by the second grooves 315 and the surface of the power generation layer 200. Since the second grooves 315 are extended in the Y direction in the turned area CA of the corrugated portion WSP, the fuel gas flow paths AS are formed as the flow path space extended in the Y direction.

In the turned area CA of the corrugated portion WSP, the respective first grooves 316 have a fixed depth from the first surface, which is equal to the depth of the first grooves 316 in the linear area SA shown in FIG. 9. The cooling liquid flow paths CS formed by the first grooves 316 on the first surface accordingly have a fixed depth. In the fuel cell 100 provided by stacking a plurality of unit cells 140, substantially the whole surface of the bottom of each of the first grooves 316 in the anode-side separator 310 is in contact with the surface of the power generation layer 200.

As shown in FIGS. 10, 5 and 6, in the turned area CA of the corrugated portion WSP, each of the second grooves 315 has shallower groove portions 314. The shallower groove portions 314 have a less depth d2 (FIG. 6) from the second surface (i.e., surface opposed to the power generally layer 200) than a depth d1 of the remaining portions (hereinafter called "deeper groove portions 313"). The position of the bottom (surface parallel to the planar direction) of the shallower groove portions 314 in the stacking direction is closer to the second surface than the position of the bottom of the deeper groove portions 313. The fuel gas flow paths AS formed by the second grooves 315 on the second surface accordingly have the varying depth, i.e., the greater depth at the positions of the deeper groove portions 313 and the less depth at the positions of the shallower groove portions 314.

In the fuel cell 100 provided by stacking a plurality of unit cells 140, the anode-side separator 310 is in contact with the surface of the cathode-side separator 320 of another adjacent unit cell 140 at the positions of the deeper groove portions 313, while being not in contact with the surface of the cathode-side separator 320 at the positions of the shallower groove portions 314. A connection flow path CP is thus formed between the first surface of the anode-side separator 310 at the position of each of the shallower groove portions 314 in the turned area CA of the corrugated portion WSP and the surface of the cathode-side separator 320 to connect two adjacent cooling liquid flow paths CS across the shallower groove portion 314. Accordingly, in the turned area CA, the cooling liquid flows both vertically and horizontally (both in the X direction and in the Y direction) through the cooling liquid flow paths CS and the connection flow paths CP. In this embodiment, as shown in FIG. 10, a plurality of shallower groove portions 314 are formed in each of the second grooves 315. Each of the shallower groove portions 314 in each second groove 315 is formed to be aligned in the X direction with adjacent shallower groove portions 314 in other adjacent second grooves 315.

As shown in FIG. 8, each of the second grooves 315 included in each turned area CA is formed to connect between the corresponding second grooves 315 included in two adjacent linear areas SA. More specifically, each of the second grooves 315 included in the first turned area CA1 connects between the corresponding second grooves 315 included in the first linear area SA1 and the second linear area SA2. Each of the second grooves 315 included in the second turned area CA2 connects between the corresponding second grooves 315 included in the second linear area SA2 and the third linear area SA3. Each of plural second grooves 315 included in the corrugated portion WSP is thus made continuous to form one serpentine fuel gas flow path AS. As described above, the respective first grooves 316 have a fixed depth and do not include any different depth portions like the shallower groove portions 314 in the second grooves 315. The fuel gas flow paths AS are accordingly formed as separate flow paths parted by the first grooves 316.

As described above, the linear area SA and the turned area CA of the corrugated portion WSP have the corrugated cross-sectional shapes including a plurality of the first grooves 316 and a plurality of the second grooves 315, which are arranged alternately. Forming each of the second grooves 315 included in each turned area CA to connect between the corresponding second grooves 315 included in two adjacent linear areas SA means that each of the first grooves 316 included in each turned area CA is also formed to connect between the corresponding first grooves 316 included in two adjacent linear areas SA.

Figure 11A:
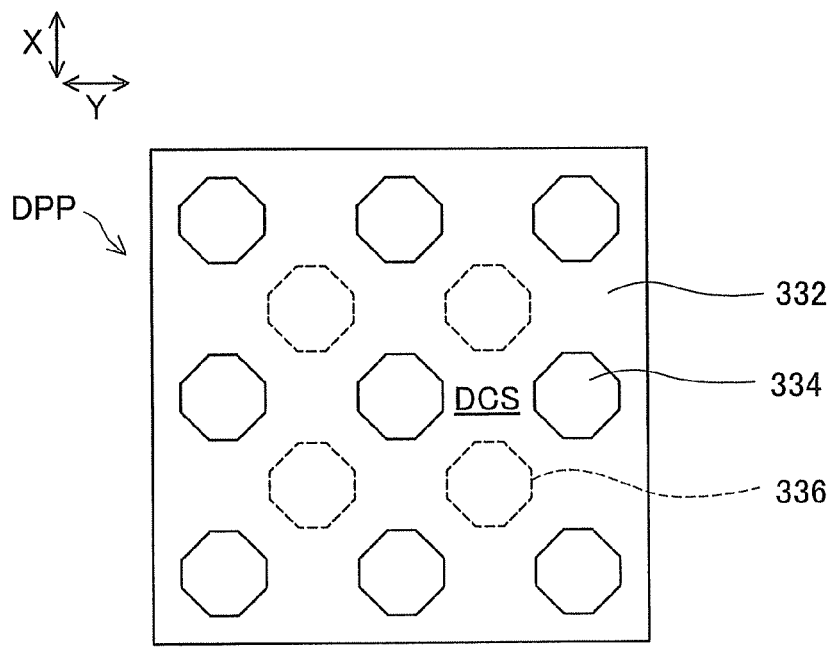
FIG. 11A and FIG. 11B illustrate the planar structure of a dimpled portion DPP.
Figure 11B:
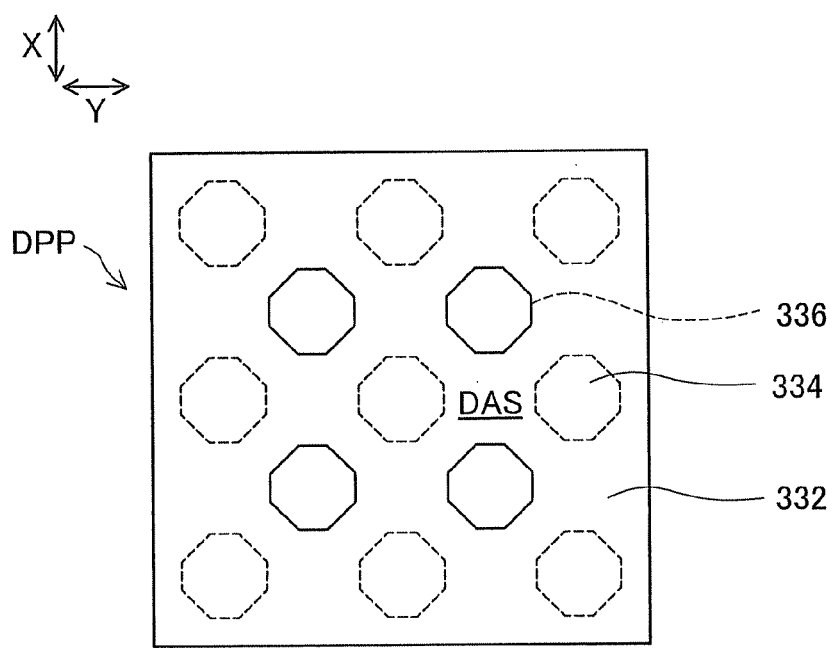

FIG. 11A and FIG. 11B illustrate the planar structure of the dimpled portion DPP. FIG. 11A shows the partial planar structure on the first surface (i.e., surface opposed to the cathode-side separator 320 of another adjacent unit cell 140) of each dimpled portion DPP. FIG. 11B shows the partial planar structure on the second surface (i.e., surface opposed to the power generation layer 200) of each dimpled portion DPP. As shown in FIGS. 11A, 11B and 4, each dimpled portion DPP includes a flat plate member 332 substantially parallel to the planar direction, a plurality of separate first projections 334 protruded on the first surface from the flat plate member 332, and a plurality of separate second projections 336 protruded on the second surface from the flat plate member 332. The first projections 334 and the second projections 336 have circular or polygonal planar shape.

On the first surface of each dimpled portion DPP, the remaining part other than the first projections 334 forms a dimpled portion cooling liquid flow path DCS. Similarly, on the second surface of each dimpled portion DPP, the remaining part other than the second projections 336 forms a dimpled portion fuel gas flow path DAS. The first projections 334 and the second projections 336 in each dimpled portion DPP are separate from one another (i.e., are not interconnected), so that the dimpled portion cooling liquid flow path DCS and the dimpled portion fuel gas flow path DAS provided in each dimpled portion DPP serve as the flow paths for the cooling liquid and the fuel gas flowing both vertically and horizontally (i.e., both in the X direction and in the Y direction). As shown in FIG. 7, the dimpled portion cooling liquid flow path DCS provided in each dimpled portion DPP connects between the respective cooling liquid flow paths CS formed on the first surface by the respective first grooves 316 in the adjacent linear area SA. Similarly, as shown in FIG. 8, the dimpled portion fuel gas flow path DAS provided in each dimpled portion DPP connects between the respective fuel gas flow paths AS formed on the second surface by the respective second grooves 315 in the adjacent linear area SA.

In this embodiment, the first projections 334 and the second projections 336 are also formed by press-working the metal plate. The first projections 334 formed on the first surface are concave to the second surface, whilst the second projections 336 formed on the second surface are concave to the first surface.

As shown in FIGS. 3 through 5, the outer circumference of the power generation layer 200 in each unit cell 140 is surrounded by a seal member (gasket) 420 to prevent cross leakage between the cathode side and the anode side. The seal member 420 may be formed by injection molding a sealing material, such as silicon rubber, butyl rubber or fluorinated rubber.

Various seal members (gaskets) are provided on the surface of the anode-side separator 310 opposed to the cathode-side separator 320 to form seal lines SL surrounding the respective manifolds and surrounding the areas for the flows of the respective fluids as shown in FIG. 2. More specifically, seal members 430 (FIG. 3) to form seal lines SL surrounding the oxidizing gas supply manifold 152 and the oxidizing gas discharge manifold 154, seal members 450 (FIG. 4) to form seal lines SL surrounding the fuel gas supply manifold 162 and the fuel gas discharge manifold 164, and seal members 440 (FIGS. 3 and 4) to form seal lines SL surrounding the areas for the flow of the cooling liquid between the anode-side separator 310 and the cathode-side separator 320 are provided on the anode-side separator 310. The respective seal members have lips (432, 442 and 452) of convex cross-sectional shape. During stacking the respective unit cells 140, the respective lips are compressed and deformed by the opposed cathode-side separator 320 to be in close contact with the surface of the cathode-side separator 320 and thereby form the seal lines SL.

As shown in FIG. 4, third grooves 317 concave to the second surface (i.e., surface opposed to the power generation layer 200) are formed near the fuel gas supply manifold 162 and the fuel gas discharge manifold 164 on the anode-side separator 310. The third grooves 317 have a less depth than the depth of the deeper groove portions 313 of the second grooves 315. The depth of the third groove 317 means a distance in the stacking direction from the outermost position of the anode-side separator 310 on the second surface (i.e., position in contact with the power generation layer 200) to the outermost position of the third groove 317 on the first surface (i.e., bottom of the third groove 317 substantially perpendicular to the stacking direction). The third groove 317 has one end continuous with the second surface of each dimpled portion DPP and the other end having an opening 318.

Each of the third grooves 317 forms a tunnel flow path TR, which runs under the seal lines SL by the seal members 440 and 450 (on the side of the power generation layer 200) and connects between the dimpled portion fuel gas flow path DAS provided in the dimpled portion DPP and the fuel gas supply manifold 162 or the fuel gas discharge manifold 164. The third groove 317 for forming the tunnel flow path TR is fully located inside, in the planar direction, the seal member 420 provided along the outer circumference of the power generation layer 200. The tunnel flow path TR is thus not opposed to the seal member 420 but is opposed to the anode diffusion layer 216 of the power generation layer 200. In this embodiment, a plurality of the tunnel flow paths TR formed by the third grooves 317 to be extended in the X direction are arranged along the Y direction (FIG. 8).

As shown by the arrows in FIGS. 4 and 8, hydrogen as the fuel gas supplied to the fuel gas supply manifold 162 runs via the opening 318 through the upstream (supply-side) tunnel flow paths TR, flows into the dimpled portion fuel gas flow path DAS formed on the second surface of the first dimpled portion DPP1 and further enters the respective fuel gas flow paths AS formed on the second surface by the second grooves 315 in the first linear area SA1 of the corrugated portion WSP.

As described above, the first dimpled portion DPP1 is opposed to the fuel gas supply manifold 162 and the cooling liquid supply manifold 172. The hydrogen running through the tunnel flow paths TR thus mainly flows into a part of the dimpled portion fuel gas flow path DAS opposed to the fuel gas supply manifold 162. The dimpled portion fuel gas flow path DAS serves as the flow path for the fuel gas flowing both vertically and horizontally (i.e., both in the X direction and in the Y direction) and connects between the respective fuel gas flow paths AS formed in the linear area SA1. The hydrogen mainly flowing into the part of the dimpled portion fuel gas flow path DAS opposed to the fuel gas supply manifold 162 accordingly flows both vertically and horizontally in the dimpled portion fuel gas flow path DAS to be distributed to the respective fuel gas flow paths AS in the linear area SA1 in a balanced manner.

As shown in FIG. 8, in the corrugated portion WSP, the hydrogen entering the inlet of the respective fuel gas flow paths AS located at the end of the linear area SA1 flows inside the serpentine fuel gas flow paths AS toward the outlet located on the boundary between the dimpled portion DDP2 and the linear area SA3. The hydrogen flowing through the dimpled portion fuel gas flow path DAS and the fuel gas flow paths AS is used for power generation by the membrane electrode assembly 210. Since the fuel gas flow paths AS are serpentine-shaped, hydrogen is efficiently distributed over the whole area of the power generation layer 200.

As shown in FIGS. 4 and 8, the remaining hydrogen not consumed in power generation flows out of the outlet of the respective fuel gas flow paths AS, enters the dimpled portion fuel gas flow path DAS formed on the second surface of the dimpled portion DPP2 to join together, runs through the downstream tunnel flow paths TR and is discharged via the opening 318 to the fuel gas discharge manifold 164. As described above, the second dimpled portion DPP2 is opposed to the fuel gas discharge manifold 164 and the cooling liquid discharge manifold 174. The hydrogen flowing out of the respective fuel gas flow paths AS flows toward a part of the dimpled portion fuel gas flow path DAS opposed to the fuel gas discharge manifold 164 and is smoothly discharged to the fuel gas discharge manifold 164.

As shown by the arrows in FIG. 3, the air as the oxidizing gas supplied to the oxidizing gas supply manifold 152 runs via an upstream (supply-side) opening 322 provided in the surface of the cathode-side separator 320 opposed to the power generation layer 200 into the cathode-side porous flow path layer 230 and is diffused and flows through the cathode-side porous flow path layer 230. The air is used for power generation by the membrane electrode assembly 210. The remaining air not consumed in power generation flows out of a downstream (discharge-side) opening 322 provided in the surface of the cathode-side separator 320 opposed to the power generation layer 200 and is discharged to the oxidizing gas discharge manifold 154.

As shown by the arrows in FIGS. 5 and 7, the cooling liquid supplied to the cooling liquid supply manifold 172 is led to the end of the second turned area CA2 and the end of the first dimpled portion DPP1 on the first surface (i.e., surface opposed to the cathode-side separator 320) of the anode-side separator 310. A plurality of guide projections 382 for guiding the cooling liquid are provided on the first surface of the anode-side separator 310 to lead the cooling liquid toward the wide range at the end of the turned area CA2 and the end of the dimpled portion DPP1.

As shown by the arrows in FIG. 5, the cooling liquid led to the end of the second turned area CA2 runs through the connection flow paths CP formed on the first surface by the shallower groove portions 314 and flows into the cooling liquid flow path CS closest to the end. As described above, in the turned area CA, the cooling liquid flows both vertically and horizontally (i.e., both in the X direction and in the Y direction) through the cooling liquid flow paths CS and the connection flow paths CP. The cooling liquid flowing into the cooling liquid flow path CS closest to the end flows along the length (Y direction) of the cooling liquid flow path CS, while moving to the other cooling liquid flow paths CS. The cooling liquid is then distributed to the respective cooling liquid flow paths CS in the turned area CA2 in a balanced manner and flows into the corresponding cooling liquid flow paths CS in the linear areas SA.

As shown by the arrows in FIG. 4, the cooling liquid led to the end of the first dimpled portion DPP1 flows into the dimpled portion cooling liquid flow path DCS formed on the first surface of the dimpled portion DPP1. As described previously, the dimpled portion DPP1 is opposed to the fuel gas supply manifold 162 and the cooling liquid supply manifold 172. The cooling liquid thus mainly flows into a part of the dimpled portion cooling liquid flow path DCS opposed to the cooling liquid supply manifold 172. The dimpled portion cooling liquid flow path DCS serves as the flow path for the cooling liquid flowing both vertically and horizontally (i.e., both in the X direction and in the Y direction) and connects between the respective cooling liquid flow paths CS formed in the linear area SA1. The hydrogen flowing into the dimpled portion cooling liquid flow path DCS accordingly flows both vertically and horizontally in the dimpled portion cooling liquid flow path DCS to be distributed to the respective cooling liquid flow paths CS in the linear area SA1 in a balanced manner.

In each of the linear areas SA, the respective cooling liquid flow paths CS are separate from one another as shown in FIG. 9. The cooling liquid flowing into the respective cooling liquid flow paths CS in the linear area SA thus linearly flows toward the cooling liquid discharge manifold 174 (along the X direction) as shown in FIG. 7.

The cooling liquid flowing through the respective cooling liquid flow paths CS in the first linear area SA1 and in the second linear area SA2 enters the corresponding cooling liquid flow paths CS in the first turned area CA1. As described previously, in the turned area CA, the cooling liquid flows both vertically and horizontally (i.e., both in the X direction and in the Y direction) through the cooling liquid flow paths CS and the connection flow paths CP. The cooling liquid flowing into each of the cooling liquid flow paths CS thus flows along the length (Y direction) of the cooling liquid flow path CS, while moving to the other cooling liquid flow paths CS. The cooling liquid eventually moves to the cooling liquid flow path CS closest to the cooling liquid discharge manifold 174 and is discharged to the cooling liquid discharge manifold 174.

As shown by the arrows in FIG. 4, the cooling liquid flowing through the respective cooling liquid flow paths CS in the third linear area SA3 enters the dimpled portion cooling liquid flow path DCS formed on the first surface of the second dimpled portion DPP2 to join together and is discharged to the cooling liquid discharge manifold 174. As described previously, the second dimpled portion DPP2 is opposed to the fuel gas discharge manifold 164 and the cooling liquid discharge manifold 174. The hydrogen flowing out of the respective cooling liquid flow paths CS flows toward a part of the dimpled portion cooling liquid flow path DCS opposed to the cooling liquid discharge manifold 174 and is smoothly discharged to the cooling liquid discharge manifold 174. A plurality of guide projections 382 for guiding the cooling liquid are provided on the first surface of the anode-side separator 310 to lead the cooling liquid from the end of the turned area CA1 and the end of the dimpled portion DPP2 toward the cooling liquid discharge manifold 174.

As described above, in this embodiment, the anode-side separator 310 has the corrugated portion WSP of the corrugated cross-sectional shape including a plurality of the first grooves 316 concave to the first surface to form the cooling liquid flow paths CS on the first side and a plurality of the second grooves 315 concave to the second surface to form the fuel gas flow paths AS on the second surface, which are arranged alternately. The corrugated portion WSP includes the mutually parallel three linear areas SA, each including a plurality of the first grooves 316 and a plurality of the second grooves 315, and the plural turned areas CA, each including a plurality of the first grooves 316 and a plurality of the second grooves 315, to connect between the corresponding grooves in the adjacent linear areas SA and thereby form the respective fuel gas flow paths AS of serpentine shape. In each of the turned areas CA, each of the second grooves 315 includes the shallower groove portions 314 having the less depth from the second surface than the remaining portions (deeper groove portions 313). The shallower groove portions 314 form the connection flow paths CP on the first surface to connect between the two adjacent cooling liquid flow paths CS. The anode-side separator 310 also has the dimpled portions DPP located respectively adjacent to the inlet and the outlet of the fuel gas flow paths AS in the corrugated portion WSP. Each of the dimpled portions DPP has the dimpled portion cooling liquid flow path DCS formed on the first surface to connect between the respective cooling liquid flow paths CS, and the dimpled portion fuel gas flow path DAS formed on the second surface to connect between the respective fuel gas flow paths AS. In the anode-side separator 310 of the embodiment, even when the fuel gas flow paths AS are formed as the flow paths of serpentine shape (serpentine flow paths) in the corrugated portion WSP of the corrugated cross-sectional shape, the dimpled portions DPP provided at the inlet and at the outlet of the serpentine fuel gas flow paths AS connect between the cooling liquid flow paths CS and between the fuel gas flow paths AS. The connection flow paths CP formed on the first surface of the turned areas CA also connect between the cooling liquid flow paths CS. This structure ensures the good distribution of the respective fluids (fuel gas and cooling liquid) through the respective fluid flow paths formed on the respective surfaces of the anode-side separator 310.

FIG. 12 shows the results of performance evaluation of a fuel cell using the anode-side separator according to the embodiment and fuel cells including anode-side separators according to comparative examples. The embodiment and the comparative examples (Comparative Examples 1 and 2) have different combinations of structures at the portions adjacent to the inlet and the outlet of the serpentine fuel gas flow paths AS (hereinafter called "inlet/outlet portion") and at the portions of the turned areas CA of the serpentine fuel gas flow paths AS (hereinafter called "turned portion"). In Comparative Example 1, the inlet/outlet portion has structure similar to the structure of the turned area CA (FIG. 10) according to the embodiment (hereinafter called "orthogonal flow path structure"), whilst the turned portion has structure similar to the structure of the dimpled portion DPP (FIG. 11A and FIG. 11B) according to the embodiment (hereinafter called "dimple structure"). In Comparative Example 2, both the inlet-outlet portion and the turned portion have the dimple structure.

FIG. 12 shows degradation or no substantial degradation of power generation performance caused by the decreased drainage performance in the reactive gas flow paths, degradation or no substantial degradation of power generation performance caused by the decreased reactive gas distribution in the reactive gas flow paths, degradation or no substantial degradation of power generation performance caused by the decreased cooling liquid distribution in the cooling liquid flow paths, and degradation or no substantial degradation of power generation performance caused by the decreased load in the stacking direction in the cell plane (decreased surface pressure) (or by the resulting decreased contact resistance) with respect to the fuel cells according to the embodiment and the respective comparative examples.

Comparative Example 1 has showed degradation of power generation performance caused by the decreased cooling liquid distribution. In Comparative Example 1, the orthogonal flow path structure is adopted for the inlet/outlet portion. The cooling liquid is thus not distributed in a balanced manner to the respective cooling liquid flow paths CS in the linear area SA1 adjacent to the inlet portion of the orthogonal flow path structure. The cooling liquid is also not discharged in a balanced manner from the respective cooling liquid flow paths CS in the linear area SA3 adjacent to the outlet portion of the orthogonal flow path structure. Such unbalanced distribution and unbalanced discharge cause degradation of power generation performance. In the embodiment, on the other hand, the dimple structure is adopted for the inlet/outlet portion. This ensures balanced distribution of the cooling liquid to the respective cooling liquid flow paths CS in the linear area SA1 adjacent to the inlet portion and balanced discharge of the cooling liquid from the respective cooling liquid flow paths CS in the linear area SA3 adjacent to the outlet portion, thus reducing degradation of power generation performance.

Comparative Example 1 has also showed degradation of power generation performance caused by the decreased surface pressure. In Comparative Example 1, the dimple structure is adopted for the turned portion having the relatively large area compared with the inlet/outlet portion. This decreases the surface pressure and thereby causes degradation of power generation performance. In the embodiment, on the other hand, while the dimple structure is adopted for the inlet/outlet portion, the orthogonal flow path structure is adopted for the turned portion having the relatively large area. This suppresses the decrease in surface pressure and thereby reducing degradation of power generation performance.

Comparative Example 2 has showed no substantial degradation of power generation performance caused by the decreased gas distribution or caused by the decreased cooling liquid distribution, but has showed degradation of power generation performance caused by the decreased drainage performance. In Comparative Example 2, the dimple structure is adopted for both the inlet/outlet portion and the turned portion, so that the respective reactive gas flow paths are interconnected at the inlet/outlet portion and at the turned portion. When water is accumulated in one reactive gas flow path, such interconnection causes the pressure in the reactive gas flow path to be released to another reactive gas flow path. This interferes with prompt discharge of the water accumulated in the reactive gas flow path and thereby causes degradation of power generation performance. In the embodiment, on the other hand, while the dimple structure is adopted for the inlet/outlet portion, the orthogonal flow path structure is adopted for the turned portion. The respective reactive gas flow paths are thus separate from one another in the portions other than the inlet/outlet portion, so that the pressure in one reactive gas flow path is not released to another reactive gas flow path. Even when water is accumulated in one reactive gas flow path, this structure ensures prompt discharge of water by the gas pressure in the reactive gas flow path, thereby reducing degradation of power generation performance.

Comparative Example 2 has also showed degradation of power generation performance caused by the decreased surface pressure. In Comparative Example 2, the dimple structure having the smaller contact area (i.e., the lower contact ratio) in stacking than the orthogonal flow path structure is adopted at a relatively high rate. This decreases the surface pressure and thereby causes degradation of power generation performance. In the embodiment, on the other hand, while the dimple structure is adopted for the inlet/outlet portion, the orthogonal flow path structure is adopted for the turned portion. This suppresses the decrease in surface pressure and thereby reduces degradation of power generation performance.

In the embodiment, some parts of the opening 362 for the fuel gas supply manifold 162 and of the opening 364 for the fuel gas discharge manifold 164 are respectively opposed to the dimpled portions DPP. Some parts of the opening 372 for the cooling liquid supply manifold 172 and of the opening 374 for the cooling liquid discharge manifold 174 are respectively opposed to the dimpled portions DPP, while other parts thereof are respectively opposed to the turned areas CA. More specifically, the first dimpled portion DPP1 is opposed to both the opening 362 for the fuel gas supply manifold 162 and the opening 372 for the cooling liquid supply manifold 172. The second dimpled portion DPP2 is opposed to both the opening 364 for the fuel gas discharge manifold 164 and the opening 374 for the cooling liquid discharge manifold 174. This structure ensures balanced distribution of both the fuel gas and the cooling liquid in the dimpled portion DPP1, while ensuring balanced discharge of both the fuel gas and the cooling liquid in the dimpled portion DPP2.

This embodiment uses only one component part, i.e., the anode-side separator 310, to form the flow paths for the cooling liquid and the flow paths for the fuel gas, thus minimizing the increase in total number of component parts and allowing for weight reduction, size reduction and cost reduction of the fuel cell 100. In the fuel cell 100 of the embodiment, the anode-side separator 310 includes the corrugated portion WSP of the corrugated cross-sectional shape, while the cathode-side separator 320 has the flat plate-like shape. This structure has the following advantageous effects, compared with the cathode-side separator 320 also structured to include the corrugated portion WSP of the corrugated cross-sectional shape. In the fuel cell 100 of the embodiment, pressure loss in the cooling liquid flow paths is determined by only the shape of the anode-side separator 310. This ensures easy suppression of a variation in pressure loss in the cooling liquid flow paths of the respective unit cells 140. The fuel cell 100 of the embodiment has no substantial loss of the contact area between the separators due to the positional misalignment in stacking, thus readily ensuring the contact area. The fuel cell 100 of the embodiment has less variation in surface pressure to the membrane electrode assembly 210, thus preventing the occurrence of a clearance between the diffusion layer and the catalyst layer and accumulation of water and reducing the concentration polarization. Additionally, the fuel cell 100 of the embodiment ensures easy processing and cost reduction of the separators.

B. Modified Examples

The invention is not limited to the above embodiment, but various modifications including modified examples described below may be made to the embodiment without departing from the scope of the invention. Some of possible examples are given below.

B1. Modified Example 1

The configuration of the fuel cell system 10 described in the above embodiment is only illustrative and may be modified in various ways. For example, although the membrane electrode assembly 210 of the embodiment includes both the anode diffusion layer 216 and the cathode diffusion layer 217, the membrane electrode assembly 210 may be modified to exclude at least one of the anode diffusion layer 216 and the cathode diffusion layer 217.

The materials for the respective layers of the fuel cell 100 and the manufacturing method of the fuel cell 100 are specified in the above embodiment. These materials and the manufacturing method are, however, only illustrative and not restrictive, but any of various other materials and any of other suitable manufacturing methods may be used for the same purpose. For example, in the above embodiment, the anode-side separator 310 is produced by press-working the metal plate. The anode-side separator 310 may, however, be produced by machining the metal plate or the resin carbon plate, by etching the metal plate, or by injection molding resin carbon. Similarly, the carbon-side separator 320 may be produced by machining the resin carbon plate or by injection molding resin carbon.

In the above embodiment, the planar shape of the unit cell 140 is a rectangle with the longer sides in the X direction. The planar shape of the unit cell 140 may be a rectangle with the longer sides in the Y direction or any different shape other than rectangle (e.g., square, polygon, circle or ellipse). The positions of the respective manifolds in the plane of the unit cell 140 may be changed to any suitable locations accessible to the inlets and the outlets of the respective fluid flow paths.

In the above embodiment, the fuel cell 100 is polymer electrolyte fuel cell. The present invention is, however, applicable to other types of fuel cells (e.g., direct methanol fuel cell and phosphoric acid fuel cell).

B2. Modified Example 2

In the above embodiment, the anode-side separator 310 is structured to have the corrugated portion WSP of the corrugated cross-sectional shape, while the cathode-side separator 320 has the flat plate-like shape. In one modified structure, the cathode-side separator 320 may be structured to have the corrugated portion WSP of the corrugated cross-sectional shape, while the anode-side separator 310 may have flat plate-like shape. In this structure, the power generation layer 200 includes an anode-side porous flow path layer, instead of the cathode-side porous flow path layer 230. The flow paths for the oxidizing gas are formed between the cathode-side separator 320 and the power generation layer 200, whilst the flow paths for the cooling liquid are formed between the cathode-side separator 320 and the anode-side separator 310.

In another modified structure, both the anode-side separator 310 and the cathode-side separator 320 may be structured to have the corrugated portion WSP of the corrugated cross-sectional shape. In this structure, the power generation layer 200 does not include any porous flow path layer. The flow paths for the fuel gas are formed between the anode-side separator 310 and the power generation layer 200, whilst the flow paths for the oxidizing gas are formed between the cathode-side separator 320 and the power generation layer 200. The flow paths for the cooling liquid are formed between the cathode-side separator 320 and the anode-side separator 310. In this structure, the second grooves 315 in the corrugated portion WSP of the anode-side separator 310 are in contact with the second grooves 315 in the corrugated portion WSP of the cathode-side separator 320. The shallower groove portions 314 in the second grooves 315 of the corrugated portion WSP may be provided in either one or both of the anode-side separator 310 and the cathode-side separator 320.

B3. Modified Example 3

In the above embodiment, each of the second grooves 315 includes a plurality of the shallower groove portions 314. Providing at least one shallower groove portion 314 in each of the second grooves 315 enables the flow direction of the cooling liquid to be not limited to the direction parallel to the flow direction of the fuel gas but to be set freely. In the above embodiment, each of the shallower groove portions 314 included in each second groove 315 is aligned with the shallower groove portions 314 included in adjacent second grooves 315 in the X direction. The formation pattern of the shallower groove portions 314 is not restricted to this pattern but may be modified arbitrarily.

B4. Modified Example 4

In the above embodiment, the corrugated portion WSP includes the three linear areas SA and the two turned areas CA. The number of linear areas SA and the number of turned areas CA included in the corrugated portion WSP may be determined arbitrarily as long as the fluid flow paths formed on one surface of the corrugated portion WSP have serpentine shape.

B5. Modified Example 5

In the above embodiment, the dimpled portion DPP including the flat plate member 332, the first projections 334 protruded on the first surface and the second projections 336 protruded on the second surface is provided adjacent to the inlet and the outlet of the serpentine fluid flow paths (fuel gas flow paths AS) in the corrugated portion WSP. Instead of the dimpled portion DPP, a flow path-forming portion of another structure to form flow paths for connecting between the fluid flow paths may be provided at both the inlet and the outlet of the corrugated portion WSP. As described in the embodiment, however, providing the dimpled portion DPP of this structure at the inlet and at the outlet reduces degradation of power generation performance caused by decreased cooling liquid distribution, compared with providing the orthogonal flow path structure at the inlet and at the outlet. Providing the orthogonal flow path structure at the inlet of the linear area SA1 may cause unbalanced distribution of the cooling liquid to the respective cooling liquid flow paths CS included in the adjacent linear area SA1. Providing the orthogonal flow path structure at the outlet of the linear area SA3 may cause unbalanced discharge of the cooling liquid from the respective cooling liquid flow paths CS included in the adjacent linear area SA3. This may result in degradation of power generation performance. In the embodiment, on the other hand, providing the dimpled portion DPP at the inlet of the linear area SA1 ensures balanced distribution of the cooling liquid to the respective cooling liquid flow paths CS included in the adjacent linear area SA1. Providing the dimpled portion DPP at the outlet of the linear area SA3 ensures balanced discharge of the cooling liquid from the respective cooling liquid flow paths CS included in the adjacent linear area SA3. This structure effectively reduces degradation of power generation performance.

B6. Modified Example 6

Figure 13:
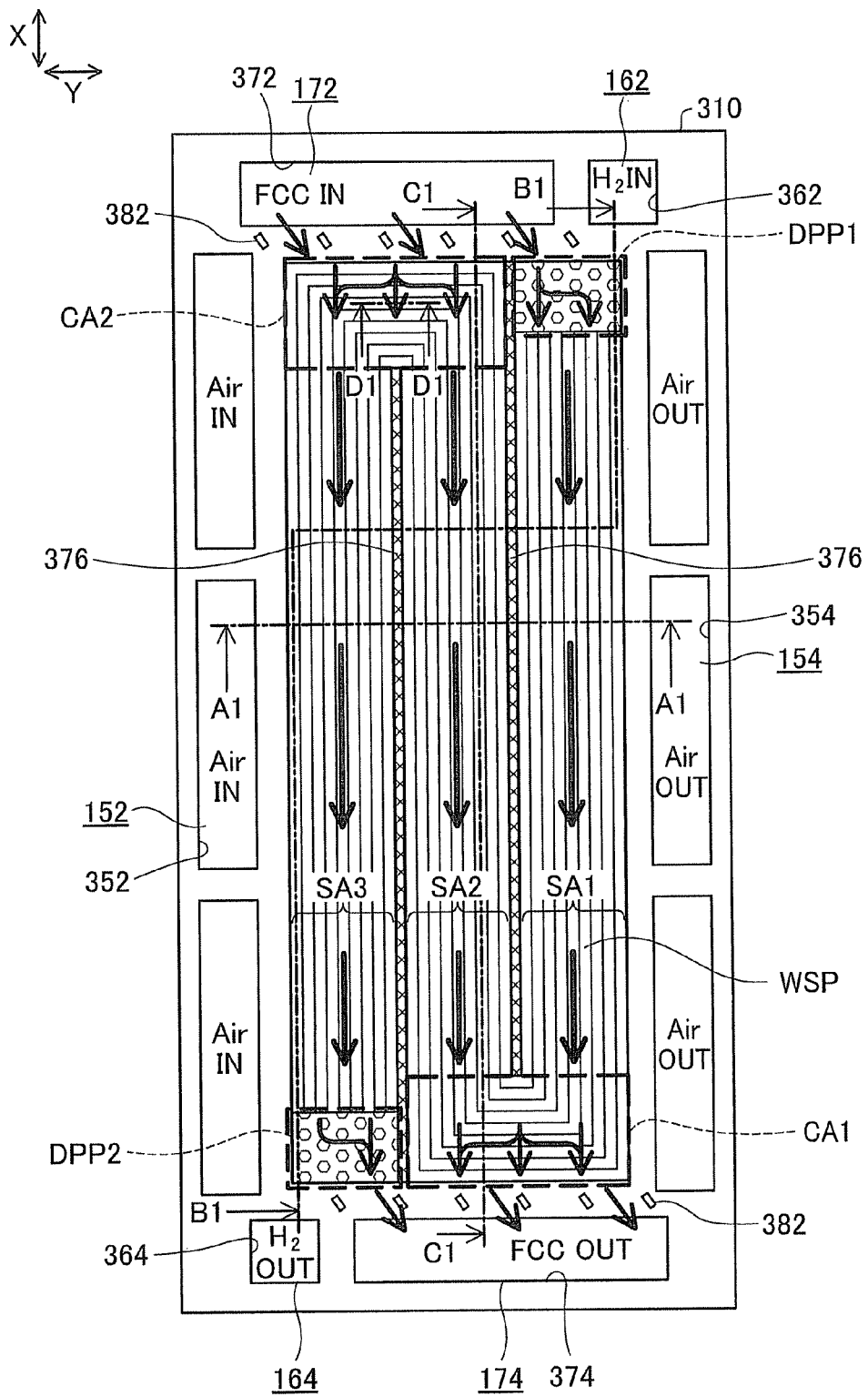
FIG. 13 illustrates the planar structure of an anode-side separator 310 according to a modified example.
Figure 14:
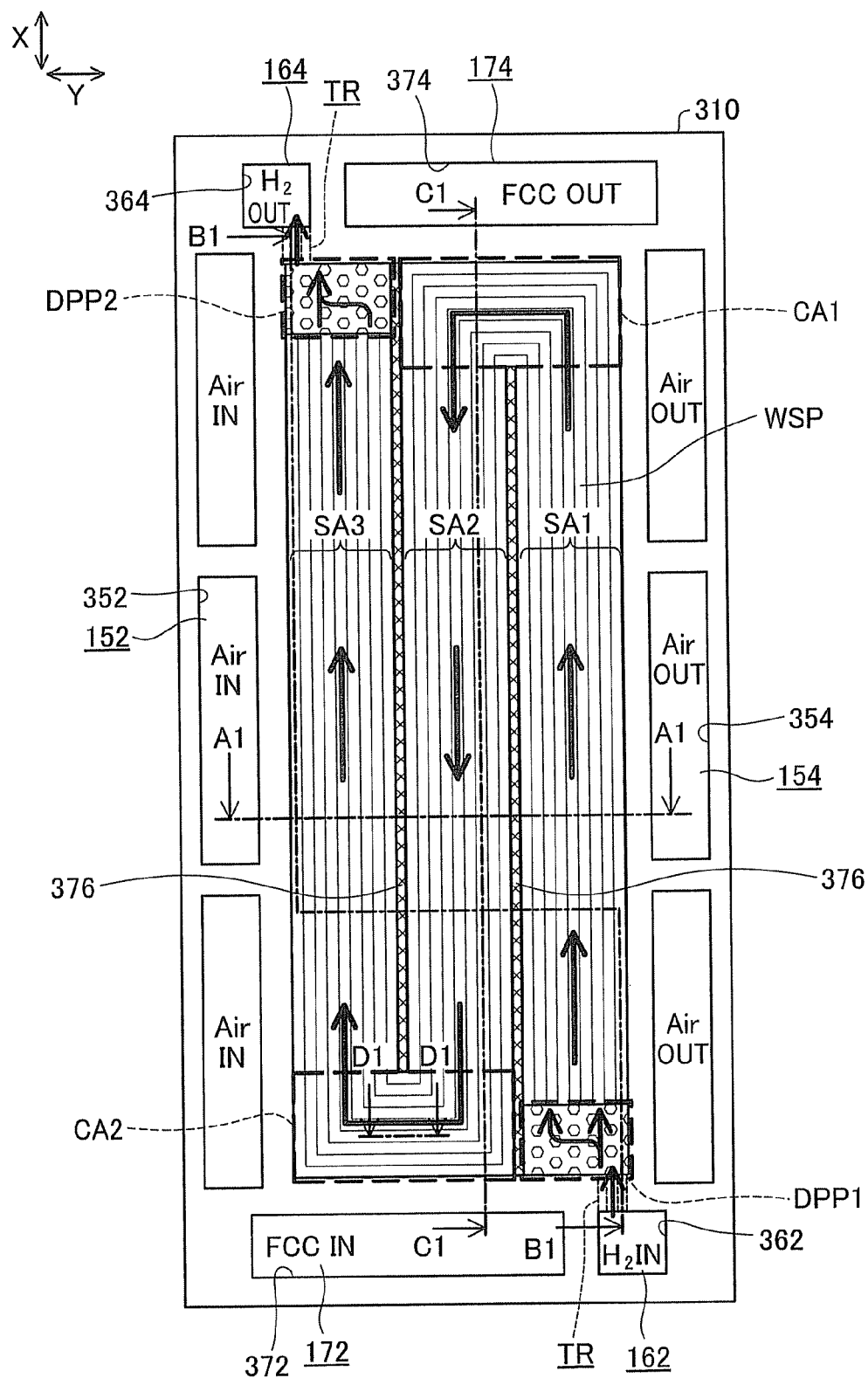
FIG. 14 illustrates the planar structure of the anode-side separator 310 according to the modified example.
Figure 15:
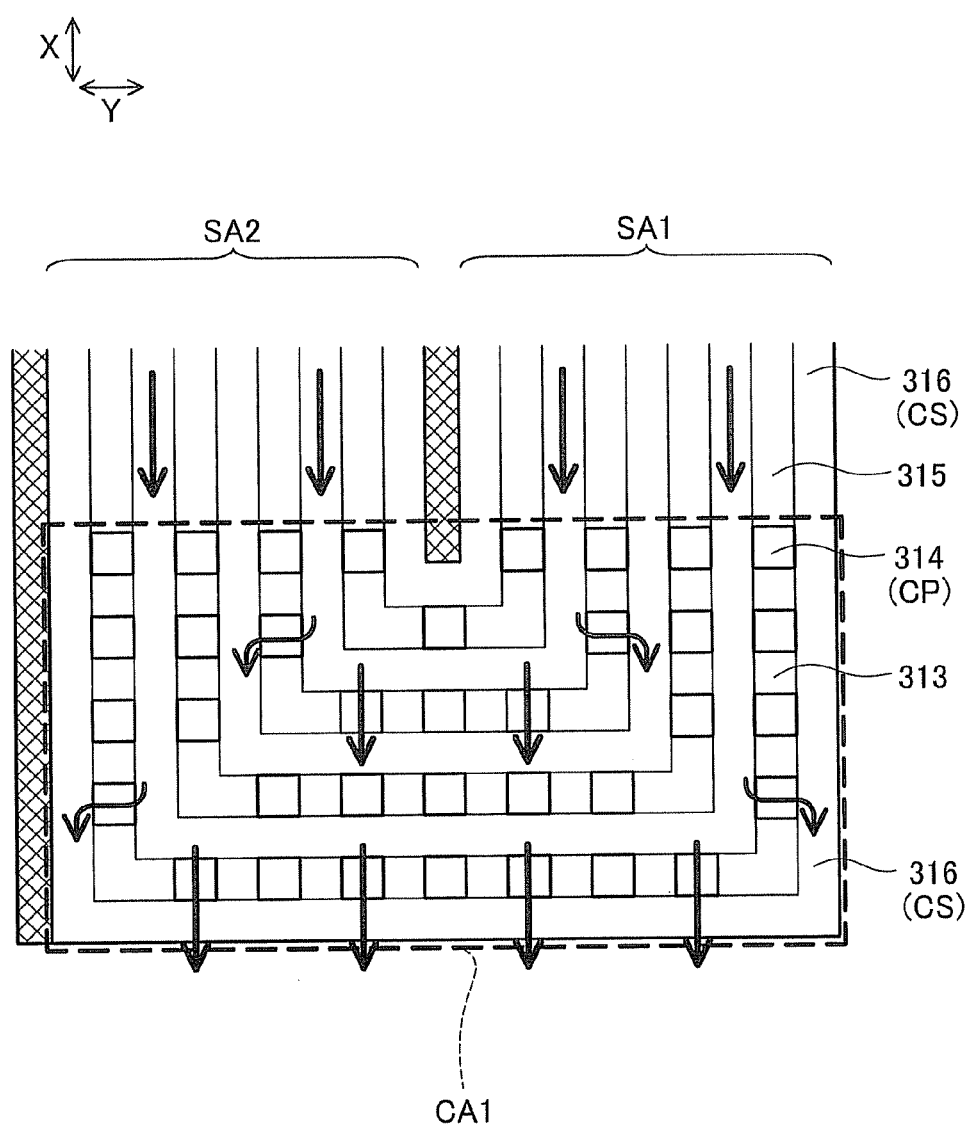
FIG. 15 is a close-up view of a turned area CA1 shown in FIG. 13.

In the above embodiment, the boundaries at the ends of the respective linear areas SA are not parallel to the Y direction but have certain angles to the Y direction, and each of the turned areas CA has approximately triangular planar shape. Each of the turned areas CA may not be necessarily formed in approximately triangular planar shape, as long as each turned area CA includes a plurality of the first grooves 316 and a plurality of the second grooves 315 to connect between the corresponding grooves in the adjacent linear areas SA and thereby forms the serpentine fuel gas flow paths AS. FIGS. 13 and 14 illustrate the planar structure of an anode-side separator 310 according to one modified example. FIG. 13 corresponds to FIG. 7 of the above embodiment, and FIG. 14 corresponds to FIG. 8 of the above embodiment. FIG. 15 is a close-up view of the turned area CA1 shown in FIG. 13. The differences of the modified example shown in FIGS. 13 to 15 from the above embodiment include that the boundaries at the ends of the respective linear areas SA are substantially parallel to the Y direction and that each of the turned areas CA has approximately rectangular planar shape. Like the above embodiment, in the modified example of FIGS. 13 to 15, each of the turned areas CA includes a plurality of the first grooves 316 and a plurality of the second grooves 315 to connect between the corresponding grooves in the adjacent linear areas SA and thereby forms the serpentine fuel gas flow paths AS. Like the above embodiment, in this modified example, each of the second grooves 315 in each turned area CA includes deeper groove portions 313 and shallower groove portions 314 (FIG. 5), so that the connection flow path CS is formed to connect between the two adjacent cooling liquid flow paths CS across the shallower groove portion 314. Accordingly, the cooling liquid flows both vertically and horizontally (i.e., both in the X direction and in the Y direction) through the cooling liquid flow paths CS and the connection flow paths CP.

What is claimed is:

1. A separator for fuel cell, comprising:
a first flow path-forming portion having a corrugated cross-sectional shape including a first groove concave to a first surface to form a flow path for a first fluid on the first surface and a second groove concave to a second surface to form a flow path for a second fluid on the second surface, which are arranged alternately, the first flow path-forming portion comprising at least three linear areas parallel to one another, each including a plurality of the first grooves and a plurality of the second grooves, and plural turned areas, each including a plurality of the first grooves and a plurality of the second grooves to connect between corresponding grooves in adjacent linear areas, and thereby forming serpentine flow paths for the second fluid; and
second flow path-forming portions provided adjacent to an inlet position and an outlet position of the flow paths for the second fluid in the first flow path-forming portion, each of the second flow path-forming portions forming a connection flow path to connect between flow paths for the first fluid on the first surface and forming a connection flow path to connect between the flow paths for the second fluid on the second surface, wherein
each of the second grooves in each of the turned areas has a shallower groove portion having less depth from the second surface than depth of a remaining portion, so that a connection flow path is formed on the first surface to connect two adjacent flow paths for the first fluid across the shallower groove portion,
wherein the first grooves are alternated with the second grooves, and
wherein the flow paths for the second fluid are separated from each other.

2. The separator according to claim 1, wherein
the first fluid is a cooling liquid; and
the second fluid is either a fuel gas or an oxidizing gas.

3. The separator according to claim 1, wherein
a second opening for forming a manifold for the second fluid is provided to be at least partly opposed to the second flow path-forming portion, and
a first opening for forming a manifold for the first fluid is provided to have one part opposed to the second flow path-forming portion and another part opposed to the turned area of the first flow path-forming portion.

4. The separator according to claim 1, wherein
each of the second flow path-forming portions includes a flat plate member, a plurality of separate first projections protruded on the first surface from the flat plate member, and a plurality of separate second projections protruded on the second surface from the flat plate member.

5. The separator according to claim 1, wherein
position of a bottom of the shallower groove portion in a stacking direction is closer to the second surface than position of the remaining portion of the second groove.

6. A fuel cell, comprising:
a power generation layer including an electrolyte membrane, an anode provided on one surface of the electrolyte membrane, and a cathode provided on the other surface of the electrolyte membrane; and
a pair of the separators according to claim 1 disposed across the power generation layer.

* * * * *